US011126320B1

(12) United States Patent
Thompson et al.

(10) Patent No.: US 11,126,320 B1
(45) Date of Patent: Sep. 21, 2021

(54) USER INTERFACES FOR BROWSING OBJECTS IN VIRTUAL REALITY ENVIRONMENTS

(71) Applicant: Amazon Technologies, Inc., Seattle, WA (US)

(72) Inventors: Lee David Thompson, Normandy Park, WA (US); Dillon Taylor Baker, Seattle, WA (US); Joonhao Chuah, Seattle, WA (US); Jesse Alan DuPree, Fall City, WA (US); Kristian Kane, Seattle, WA (US); Hai Quang Kim, Bellevue, WA (US); Brian James Mount, Seattle, WA (US); Michael Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/711,190

(22) Filed: Dec. 11, 2019

(51) Int. Cl.
*G06F 3/0481* (2013.01)
*G06F 3/0484* (2013.01)
*G06F 3/0482* (2013.01)
*G06T 19/00* (2011.01)

(52) U.S. Cl.
CPC ........ *G06F 3/04815* (2013.01); *G06F 3/0482* (2013.01); *G06F 3/04847* (2013.01); *G06T 19/006* (2013.01)

(58) Field of Classification Search
CPC .. G06F 3/0482; G06F 3/04815; G06T 19/006
See application file for complete search history.

(56) References Cited

U.S. PATENT DOCUMENTS

| 2017/0052507 | A1  | 2/2017  | Poulos et al. |
| 2019/0251753 | A1* | 8/2019  | Canada ................. G06T 19/006 |
| 2019/0340821 | A1* | 11/2019 | Chen ...................... G06F 3/017 |

\* cited by examiner

*Primary Examiner* — Matthew Salvucci
(74) *Attorney, Agent, or Firm* — Athorus, PLLC

(57) ABSTRACT

Systems and methods related to user interfaces for virtual reality environments may include two-dimensional grid view user interfaces and three-dimensional side-by-side view user interfaces, and associated transitions therebetween. The two-dimensional grid view user interfaces may present images or models of a plurality of objects to users in a substantially flat, two-dimensional grid for viewing of objects. The three-dimensional side-by-side view user interfaces may present models of a plurality of objects to users in a substantially open, three-dimensional area for viewing and evaluation of three-dimensional models of objects.

20 Claims, 14 Drawing Sheets

USER INTERFACES FOR BROWSING OBJECTS IN VIRTUAL REALITY ENVIRONMENTS

BACKGROUND

Virtual reality devices such as headsets with corresponding controllers are increasing in use. Generally, virtual reality devices may allow users to be completely immersed in digital environments, such as video games or other virtual reality environments. However, conventional, text-based menus, associated menu structures, and text-based user interfaces may be difficult, cumbersome, and unnatural to use in such immersive digital environments, and may also reduce the desired immersive effect when using virtual reality devices. Accordingly, there is a need for virtual reality user interfaces that facilitate simple and intuitive interactions by users with objects or other aspects of the digital environments.

DETAILED DESCRIPTION

Figure 1:
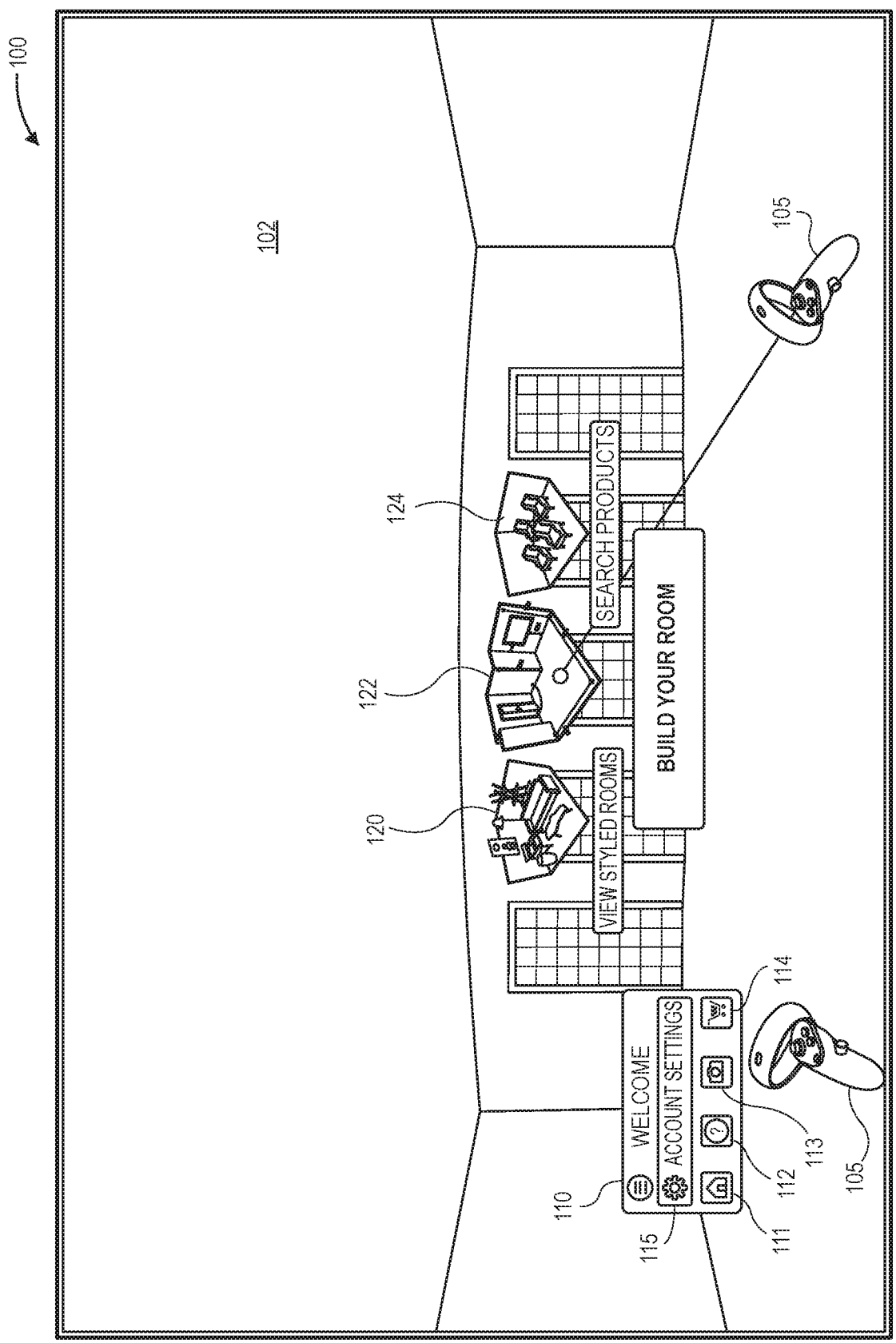
FIG. 1 is a schematic diagram of an example virtual reality environment, in accordance with implementations of the present disclosure.

As is set forth in greater detail below, implementations of the present disclosure are directed to systems and methods related to two-dimensional grid view user interfaces and three-dimensional side-by-side view user interfaces for virtual reality, augmented reality, mixed reality, and/or extended reality environments to present and facilitate object browsing and evaluation. Using the user interfaces described herein, users may be able to search, browse, view, select, place, move, remove, modify, save, evaluate, compare, purchase, or otherwise manipulate various objects and/or portions of a virtual reality environment in a simple, intuitive, and immersive manner.

In example embodiments, the example user interfaces for virtual reality environments described herein may include two-dimensional grid views that present one or more categories of objects, one or more subcategories of objects, and/or one or more objects to facilitate searching and browsing of a plurality of objects. The one or more objects may comprise two-dimensional images or three-dimensional models of objects, and may be associated with available objects for purchase, one or more lists of objects generated by a user, one or more dynamic containers of objects generated by a user, a shopping cart or list of objects generated by a user, and/or one or more aspects related to a user or user account. In addition, the one or more objects may comprise furniture, tables, chairs, lamps, rugs, sofas, artwork, mirrors, appliances, other furnishings, doors, windows, trim, paint, flooring, surface coverings or treatments, other fixtures, user account settings, preferences, histories, recommendations, help topics, saved images or screenshots, and/or other aspects of virtual reality environments.

The two-dimensional grid views of one or more objects may include at least some information associated with each of the objects. In addition, the two-dimensional grid views may be organized or separated into a plurality of pages, and each page may be scrollable by a user. Further, various filters may be applied to the two-dimensional grid views of objects to modify the plurality of objects that are presented, e.g., based on filters such as price, user rating, brand, type, style, color, or others.

Upon hovering over an object in a two-dimensional grid view of objects, at least one additional detail associated with the object may be presented within the two-dimensional grid view. Upon selection of an object in a two-dimensional grid view of objects, an image or model of the selected object may be presented overlaying the two-dimensional grid view, as well as additional details associated with the object. Upon placement of an object from a two-dimensional grid view of objects or from a selection of the object into a virtual reality environment, e.g., a room or space within the virtual reality environment, a model of the selected object may be presented within the virtual reality environment. Further, upon placement of an object from a two-dimensional grid view of objects or from a selection of the object into a dynamic container of the virtual reality environment, a model of the selected object may be added to and/or presented within the dynamic container of the virtual reality environment.

In additional example embodiments, the example user interfaces for virtual reality environments described herein may include three-dimensional side-by-side views that present one or more categories of objects, one or more subcategories of objects, and/or one or more objects to facilitate side-by-side viewing and evaluation of a plurality of objects. The one or more objects may comprise two-dimensional images or three-dimensional models of objects, and may be associated with available objects for purchase, one or more lists of objects generated by a user, one or more dynamic containers of objects generated by a user, a shopping cart or list of objects generated by a user, and/or one or more aspects related to a user or user account. In addition, the one or more objects may comprise furniture, tables, chairs, lamps, rugs, sofas, artwork, mirrors, appliances, other furnishings, doors, windows, trim, paint, flooring, surface coverings or treatments, other fixtures, user account settings, preferences, histories, recommendations, help topics, saved images or screenshots, and/or other aspects of virtual reality environments.

The three-dimensional side-by-side views of one or more objects may include at least some information associated with each of the objects. In addition, the three-dimensional side-by-side views may be organized or separated into a plurality of floors or pages, which may correspond to the plurality of pages of the two-dimensional grid views. Further, various filters may be applied to the three-dimensional side-by-side views of objects to modify the plurality of objects that are presented, e.g., based on filters such as price, user rating, brand, type, style, color, or others.

Upon hovering over an object in a three-dimensional side-by-side view of objects, at least one additional detail associated with the object may be presented within the three-dimensional side-by-side view. Upon selection of an object in a three-dimensional side-by-side view of objects, additional details associated with the selected object may be presented within the three-dimensional side-by-side view. Upon placement of an object from a three-dimensional side-by-side view of objects into a virtual reality environment, e.g., a room or space within the virtual reality environment, a model of the selected object may be presented within the virtual reality environment. Further, upon placement of an object from a three-dimensional side-by-side view of objects into a dynamic container of the virtual reality environment, a model of the selected object may be added to and/or presented within the dynamic container of the virtual reality environment.

In additional example embodiments, the one or more objects that may be presented via the two-dimensional grid views and/or three-dimensional side-by-side views may comprise various other types of products or items, including but not limited to apparel, books, electronics, luggage, jewelry, consumer goods, food, beverages, vehicles, equipment, or various other types of products or items. Further, the one or more objects may also be defined with various aspects or attributes. For example, the aspects or attributes may include a type, category, size, shape, dimensions, mass, weight, volume, color, texture, pattern, material, price, rating, availability, purchase options, other menu options, or other attributes of an object. In addition, the aspects or attributes may include a bounding box or volume that substantially surrounds an outer periphery of an object. The bounding box or volume may include a rectangular prism, a cylindrical prism, a sphere, other polygonal volume, or other irregularly shaped volume.

In further example embodiments, the dynamic containers of the virtual reality environments may facilitate the dynamic generation by users of groups of objects for quick browsing, saving, evaluation, placement, and/or removal of objects using two-dimensional grid views and/or three-dimensional side-by-side views within virtual reality environments. The dynamic containers may include modifiable characteristics such as various numbers, shapes, sizes, scales, positions, and/or orientations of dynamic containers, and one or more objects may be added to and/or presented within the dynamic containers in various numbers, sizes, scales, spacings, positions, and/or orientations. The various shapes and sizes of dynamic containers may comprise plates, trays, bowls, bins, circular shapes, rectangular shapes, spherical shapes, rounded shapes, prismatic shapes, or other two-dimensional or three-dimensional shapes and sizes. In addition, various filters may be applied to the dynamic containers of objects to modify the organization or placement of objects or groups of objects that are presented within dynamic containers, e.g., based on filters such as price, user rating, brand, type, style, color, or others. Further, the numbers, shapes, sizes, scales, spacings, positions, and/or orientations of dynamic containers and objects presented therein may be modified by users. Moreover, the dynamic containers may be attached to one or more controllers used by users within virtual reality environments, and/or may be placed, moved, oriented, or otherwise manipulated by users within virtual reality environments.

Upon hovering over an object within a dynamic container, at least one additional detail associated with the object may be presented within the dynamic container. Upon selection of an object within a dynamic container, an image or model of the selected object may be presented overlaying a current view, as well as additional details associated with the object. Upon placement of an object from a dynamic container into a virtual reality environment, e.g., a room or space within the virtual reality environment, a model of the selected object may be presented within the virtual reality environment. Further, upon removal of an object from a dynamic container of the virtual reality environment, a model of the selected object may be removed from and/or no longer presented within the dynamic container of the virtual reality environment.

Using the example user interfaces described herein, users may search, browse, view, select, place, move, remove, modify, save, evaluate, compare, purchase, or otherwise manipulate various objects via the two-dimensional grid views and/or three-dimensional side-by-side views within virtual reality environments. In addition, using the example user interfaces described herein, users may dynamically generate, save, and/or modify dynamic containers having one or more objects presented therein for quick browsing, saving, evaluation, placement, and/or removal of objects within virtual reality environments.

As one skilled in the art will appreciate in light of this disclosure, certain embodiments may be capable of achieving certain advantages, including some or all of the following: intuitively and efficiently presenting objects in two-dimensional grid views to improve and simplify user experiences such as object browsing within virtual reality environments, intuitively and efficiently presenting objects in three-dimensional side-by-side views to improve and simplify user experiences such as object evaluation and comparison within virtual reality environments, maintaining and improving immersive virtual reality experiences using visual and intuitive combinations of two-dimensional and three-dimensional user interfaces, improving and simplifying virtual reality user interfaces and user experiences by providing intuitive dynamic containers for quick interaction with and manipulation of objects within virtual reality environments, intuitively presenting various different levels of information or details associated with objects based on user interactions with objects within virtual reality environments, improving and simplifying virtual reality experiences by enabling simple and intuitive searching, browsing, viewing, selection, placement, movement, removal, modification, saving, evaluation, comparison, sharing, purchasing, and other manipulations associated with objects within virtual reality environments, etc.

The task of navigating a large electronic catalog of objects or items (e.g., a catalog with millions or billions of items) to locate objects or items of interest can be burdensome and time consuming for users, especially if the users do not know the names or generic descriptors of the desired items. Typically, the user can locate items by navigating a text-based, browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the objects or items of interest are not accurately or intuitively categorized, requiring the user to perform additional navigation or keyword searching. Thus, the user frequently has to perform numerous navigational steps to arrive at the catalog page or "item detail page" of interest. When the user arrives at the catalog page or "item detail page" of interest, the user may then need to perform additional navigational steps or perform additional searches to identify whether the desired item includes the desired features. For example, the user may need to click on and navigate to various product images to see what the product looks like from various angles. By way of another example, the user may need to scroll through numerous community provided content to see if the item is appropriate for a given environment (e.g., scrolling through hundreds of images from other users to see how the item looks in their environment—such as a how a chair looks in combination with other furniture and carpets). By way of still another example, the user may need to sift through hundreds or thousands of customer reviews and questions/answers to determine if the item includes desired features and compatibility characteristics.

Another technological advance of the present disclosure is that the generation and use of combinations of visual, intuitive, two-dimensional and three-dimensional user interfaces allows users to identify objects or items of interest with fewer clicks, scrolls, and/or page navigations than would otherwise be required to identify, view, and evaluate items. For example, in the embodiments described herein, when the user is presented with one or more items via the visual and intuitive user interfaces, the user can easily browse a plurality of presented items, evaluate or compare a plurality of presented items side-by-side, view additional details of various presented items, select various items to view even more additional details, quickly browse related or similar items to a selected item, save items of interest to dynamic containers for additional evaluation, and/or select, place, modify, and/or remove various items within the virtual reality environments.

Furthermore, with respect to individual presented items, a reference or link may be included or embedded that allows the user to navigate directly to sources of additional information about the item or another item (e.g., other items that include different color, size, or other options for a presented item, other items that are similar, related, popular, or recommended with respect to a presented item). Each reference or link thus serves as a programmatically selected navigational shortcut to an item detail page or description or to other item detail pages and associated details, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the recommended items via the browse tree or via searching. This can be particularly true for computing devices with small screens, where fewer items can be displayed to the user at a time and thus navigation of larger volumes of items is more difficult, as well as for virtual reality computing devices with potentially limited textual input methods, where the input of names, categories, keywords, or other search terms may be more difficult and thus identification of items of interest from larger volumes of items is more difficult using conventional, text-based methods.

FIG. 1 is a schematic diagram 100 of an example virtual reality environment, in accordance with implementations of the present disclosure.

As shown in FIG. 1, an example virtual reality environment 102 may be presented as including a plurality of environment surfaces, such as one or more floor surfaces, one or more wall surfaces, one or more ceiling surfaces, and/or one or more other environment surfaces. Further, the various environment surfaces may be presented as including one or more fixtures, such as doors, windows, trim, paint, flooring, surface coverings or treatments, or other fixtures.

In example embodiments, virtual reality environments including various aspects, objects, and/or items may be viewed or experienced by one or more users. For example, a user may view or experience a virtual reality environment using a headset, goggles, or other wearable computing device that visually presents the virtual reality environment via one or more display devices or presentation devices. In addition, a user may receive audio sounds, alerts, notifications, and/or feedback via one or more speakers or audio output devices related to portions of the experience within the virtual reality environment. Further, a user may provide speech, audio input, and/or feedback via one or more microphones or audio input devices related to portions of the experience within the virtual reality environment. The audio input may include audio or voice commands, instructions, or directions to control portions of the experience, and/or the audio input may include speech or conversations between multiple users of the virtual reality environment. Moreover, a user may interact with or manipulate one or more selectable objects or other aspects of the virtual reality environment using one or more controllers, joysticks, or other input/output devices related to portions of the experience within the virtual reality environment. The inputs may include commands, instructions, or directions related to searching, browsing, viewing, selecting, placing, moving, removing, modifying, saving, evaluating, comparing, purchasing, and/or other interactions or inputs related to one or more selectable objects or other aspects of the virtual reality environment. Furthermore, one or more input/output devices, including a headset, goggles, other wearable computing device, controllers, joysticks, or other input/output devices, may provide haptic or tactile outputs and/or feedback related to portions of the experience within the virtual reality environment. The outputs may include alerts, notifications, and/or feedback related to confirmation or completion of one or more actions, errors or alerts related to one or more actions, manipulation or modification of one or more selectable objects, movement or actions of one or more users, or various other feedback related to interactions within the virtual reality environment.

An example virtual reality environment may include a plurality of environment surfaces. For example, the environment surfaces may include one or more floor surfaces, one or more wall surfaces, one or more ceiling surfaces, and/or other environment surfaces. Each environment surface may have various associated aspects or attributes, such as size, shape, position, orientation, dimensions, color, texture, pattern, material, or other attributes. In addition, one or more of the aspects or attributes of an environment surface may be selected, modified, or otherwise manipulated. For example, color, texture, or pattern of an environment surface, such as paint color, wallpaper texture, or other pattern on a wall surface, may be modified. Further, color, texture, pattern, or material of an environment surface, such as vinyl, hardwood, or carpet on a floor surface, may be modified.

In example embodiments, a virtual reality environment, such as an outdoor space, deck, porch, patio, or other partially unbounded space, may include one or more environment surfaces that represent boundaries of the space that are not necessarily wall or ceiling surfaces. Such boundaries may be substantially transparent or translucent, and/or may be visible or highlighted upon user interaction or proximity to the boundaries. In addition, the boundaries may also include various associated aspects or attributes, such as size, shape, position, orientation, dimensions, color, texture, pattern, material, or other attributes. In some example embodiments, the color, texture, or pattern of a boundary may include an image or rendering of surroundings, such as an outdoor space, backyard, neighborhood, street, or other images.

In addition, a virtual reality environment may also include one or more three-dimensional objects or models, which may also be described simply as objects in the discussion herein. For example, the three-dimensional objects may include any of various types of selectable object or items, including furniture, furnishings, fixtures, apparel, books, electronics, luggage, jewelry, consumer goods, food, beverages, vehicles, equipment, or various other types of products or items. Although particular types, numbers, and arrangements of objects are illustrated herein, a virtual reality environment may include any other types, numbers, and arrangements of objects.

Each three-dimensional object or model may have various associated aspects or attributes, such as a type, category, size, shape, dimensions, mass, weight, volume, color, texture, pattern, material, price, rating, availability, purchase options, other menu options, or other attributes of an object. In addition, one or more of the attributes of an object may be selected, modified, or otherwise manipulated. For example, a particular object within a type or category may be selected or modified, such as between different designs or models of chairs, tables, rugs, pictures, clocks, mirrors, etc. In addition, color, texture, pattern, size, or material of an object may be changed or modified, such as between different colors of furniture, different materials of sofas or chairs, different patterns of rugs, different finishes of tables or chairs, different sizes of coffee tables or pictures, etc. Further, a type or category of an object may define the object as a table, chair, end table, coffee table, rug, sofa, lamp, picture, vase, or various other types or categories of objects. Moreover, size, shape, dimensions, mass, weight, or volume of an object may be received from a manufacturer, supplier, distributor, or other provider of the object, or may be determined using one or more machine learning, computer vision, and/or geometrical detection algorithms or approaches. Furthermore, price, rating, availability, purchase options, or other menu options may also be received from a manufacturer, supplier, distributor, or other provider of the object and/or updated over time, and may be viewed or selected by a user.

In addition, the various aspects or attributes of a three-dimensional object or model may include a bounding box or volume that substantially surrounds an outer periphery of an object. The bounding box or volume may include a rectangular prism, a cylindrical prism, a sphere, other polygonal volume, or other irregularly shaped volume. In some example embodiments, a bounding box or volume may be received from a manufacturer, supplier, distributor, or other provider of the object. In other example embodiments, a bounding box or volume may be determined using one or more machine learning, computer vision, and/or geometrical detection algorithms or approaches. For example, the algorithms may comprise various surface, edge, line, or other feature detection algorithms, and/or mesh decimation algorithms, potentially in combination with various computer vision and machine learning algorithms, that may process and analyze one or more images or videos comprising an object in order to detect various surfaces, edges, lines, or other features of an object and determine a bounding box or volume associated with the object.

Various aspects or attributes of environment surfaces and/or three-dimensional objects or models may be modified, manipulated, and/or interacted with by one or more users of virtual reality environments using the user interfaces described herein. As further described herein, a user may browse, view, select, place, move, remove, save, evaluate, compare, and/or modify one or more aspects of a virtual reality environment or one or more environment surfaces thereof, a user may browse, view, select, save, evaluate, compare, and/or modify one or more aspects of an object within a virtual reality environment, and/or a user may browse, view, select, place, move, remove, save, evaluate, compare, purchase, and/or modify one or more objects within the virtual reality environment.

As shown in FIG. 1, one or more controllers, joysticks, or other input/output devices 105 may be at least partially presented within a field of view of a user within a virtual reality environment. For example, a user may utilize only one controller 105, e.g., using a dominant hand, or a user may utilize two controllers 105, e.g., one controller associated with each hand. Each of the controllers 105 may include a laser pointer or other pointing device that extends from the controller 105 in a substantially straight line that may be aligned with and used to point to, hover over, select, or otherwise manipulate or interact with one or more objects within a virtual reality environment. In addition, one or both controllers 105 may also include a menu 110 that may be attached or associated with the controller 105, and the menu 110 may include various selectable options, such as a home button 111, a help button 112, a camera or screenshot button 113, a shopping cart or list button 114, and a user account settings button 115. Various other selectable options may also be included in the menu 110, as further described herein.

For example, the home button 111 may return a user to an initial, default, or home screen associated with a virtual reality experience or environment, such as the view presented in FIG. 1, the help button 112 may present various help topics, frequently asked questions, or other information to assist users within a virtual reality environment, the camera button 113 may enable a user to capture one or more images of a virtual reality experience or environment, e.g., for later viewing or to share with other users, the shopping cart button 114 may present a list or view of objects placed within a shopping cart for potential purchase, and the user account settings button 115 may present various information associated with the user or user account, such as profile information, order information, shipping information, payment information, saved lists or groups of objects, user preferences, search histories, recommendations, or other information.

In the example shown in FIG. 1, a user may use a right hand controller substantially as a pointing device, e.g., using a dominant right hand, and a menu 110 may be attached or associated with a left hand controller. Then, using the right hand controller, the user may manipulate or interact with objects within the virtual reality environment using the pointing device, and may also interact with selectable options in the menu 110 using the pointing device. In other examples utilizing only a single controller, the user may use a single controller substantially as a pointing device, e.g., using a dominant hand. Then, using the single controller, the user may manipulate or interact with objects within the virtual reality environment using the pointing device, and may also interact with selectable options in the associated menu 110 using various buttons, trigger buttons, joysticks, or other input elements associated with the single controller.

In example embodiments, the one or more controllers, joysticks, or other input/output devices may include one or more buttons, trigger buttons, joysticks, directional pads, track pads, touch sensitive surfaces, or other input elements. Various individual input elements or combinations of input elements may be actuated or selected to provide corresponding commands, instructions, or directions related to portions of the experience within the virtual reality environment. For example, one or more buttons, trigger buttons, and/or joysticks may allow selection, movement, placement, or other interaction with objects presented via two-dimensional grid and/or three-dimensional side-by-side user interfaces or portions thereof. In addition, one or more buttons, trigger buttons, and/or joysticks may allow selection, movement, placement, or other interaction with aspects of virtual reality environments, portions of user interfaces, and/or selectable objects and associated aspects or attributes. One or more buttons, trigger buttons, and/or joysticks may allow selection, movement, placement, or other interaction with selectable objects within portions of the environment and/or within dynamic containers of the environment. One or more joysticks, directional pads, track pads, or touch sensitive surfaces may allow movement or other manipulation of a user position within the environment, e.g., teleporting to various positions within the environment. Various other input elements, or combinations thereof, may allow and/or enable any of the various manipulations or interactions within virtual reality environments further described herein.

As further shown in FIG. 1, an example virtual reality environment may include a plurality of selectable options related to viewing, browsing, searching, selecting, modifying, and/or evaluating one or more objects within the virtual reality environment. For example, the selectable options may include options such as view styled rooms 120, build your room 122, and search products 124. Various other selectable options may also be included in the virtual reality environment, as further described herein.

For example, the view styled rooms 120 option may present various designed or curated rooms or spaces and associated objects for viewing by a user within the virtual reality environment, and various aspects of the styled rooms or spaces may be viewed, selected, modified, saved, evaluated, or interacted with by the user. The build your room 122 option may present various templates from which a user may generate or create a desired room or space, including a floor, walls, ceiling, dimensions, paint, flooring, and other fixtures, as well as design or decorate the room or space as desired with various furniture, other furnishings, or other objects. Further, the search products 124 option may present various two-dimensional grid view user interfaces and/or three-dimensional side-by-side view user interfaces via which a user may search, browse, view, select, place, move, remove, save, evaluate, compare, purchase, and/or modify one or more objects within the virtual reality environment. Moreover, various two-dimensional grid view user interfaces and/or three-dimensional side-by-side view user interfaces may also be selectable for presentation to a user responsive to selection of the view styled rooms 120 or build your room 122 options, e.g., to view or modify various fixtures, furniture, furnishings, or other objects included in styled rooms, and/or to view or modify various fixtures furniture, furnishings, or other objects included in rooms generated by a user.

Figure 2:
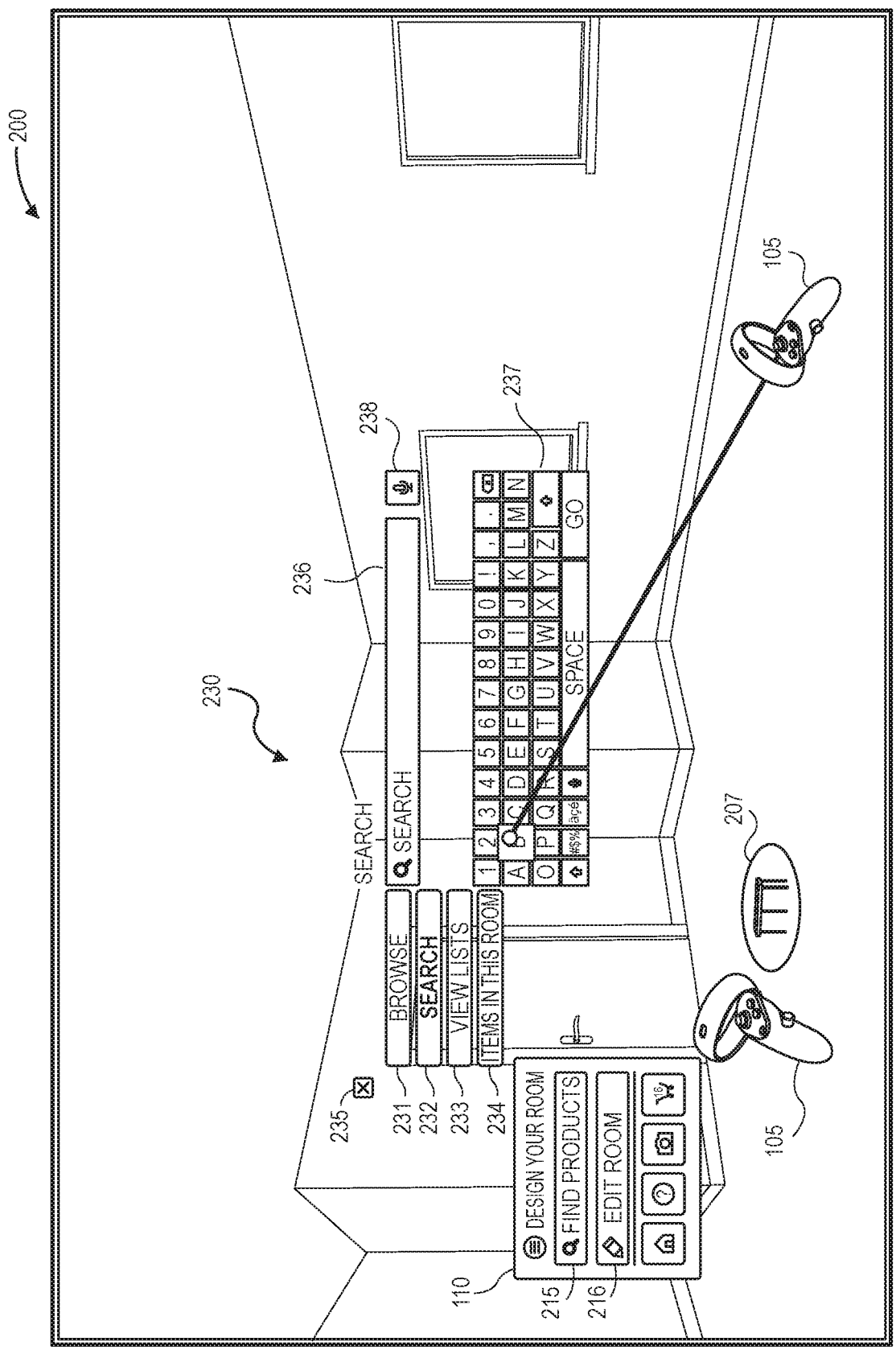
FIG. 2 is a schematic diagram of an example search interface including a dynamic container for a virtual reality environment, in accordance with implementations of the present disclosure.

FIG. 2 is a schematic diagram 200 of an example search interface including a dynamic container for a virtual reality environment, in accordance with implementations of the present disclosure.

As shown in FIG. 2, upon selection of the search products 124 option as shown in FIG. 1, or upon initiation of a search function via other inputs or selections within the virtual reality environment, an example search interface 230 may be presented to a user within the virtual reality environment. In addition, upon initiation of a search function within the virtual reality environment, one or more selectable options associated with the menu 110 that may be attached or associated with the controller 105 may change. For example, additional selectable options may include a find products button 215 and an edit room button 216. Various other selectable options may also be included in the menu 110, as further described herein.

For example, the find products button 215 may present the example search interface 230, such as the view shown in FIG. 2, or may present various category or catalog browse or search interfaces for furniture, furnishings, or other objects as two-dimensional grid view user interfaces and/or three-dimensional side-by-side view user interfaces, as further described herein. In addition, the edit room button 216 may also present various category or catalog browse or search interfaces for fixtures or other objects as two-dimensional grid view user interfaces and/or three-dimensional side-by-side view user interfaces, as further described herein. Moreover, the edit room button 216 may also enable a user to modify aspects of a room or space within the virtual reality environment, such as doors, windows, floors, walls, ceilings, dimensions, or other aspects of a room or space.

As shown in FIG. 2, the example search interface 230 may include a plurality of selectable options in a left hand column or panel, and a keyboard, text, or voice search interface in a middle column or panel. The plurality of selectable options may include a browse button 231, a search button 232, a view lists button 233, an items in this room button 234, and a close button 235. Various other selectable options may also be included in the example search interface 230, as further described herein.

In addition, the left hand column or panel and the middle column or panel may be associated with a same plane or surface that is presented at a defined distance in front of a user position within the virtual reality environment. Alternatively, the left hand column or panel and the middle column or panel may be angled relative to each other and associated with different planes or surfaces, and each plane or surface may be presented at a defined distance in front of a user position and substantially facing or angled toward a user position within the virtual reality environment, e.g., such that the left hand column or panel and the middle column or panel form an approximate arc or curve around a user position. Further, the example search interface 230 may be presented as overlaying the virtual reality environment, e.g., overlaying a room or space within the virtual reality environment, and the room or space may be presented as darkened, dimmed, or grayed out in order to facilitate user focus and interaction with the example search interface 230.

For example, the browse button 231 may present various category or catalog browse or search interfaces for furniture, furnishings, fixtures, or other objects as two-dimensional grid view user interfaces and/or three-dimensional side-by-side view user interfaces, as further described herein. In addition, the search button 232 may present the example search interface 230, such as the view shown in FIG. 2. Further, the view lists button 233 may present various lists or groups of furniture, furnishings, or other objects, whether designed or curated by others or generated by a user, as two-dimensional grid view user interfaces and/or three-dimensional side-by-side view user interfaces, as further described herein. Similarly, the items in this room button 234 may present a list or group of furniture, furnishings, or other objects currently associated with the room or space as two-dimensional grid view user interfaces and/or three-dimensional side-by-side view user interfaces, as further described herein. In addition, the close button 235 may cause the search interface 230 to be closed and no longer presented to a user within the virtual reality environment.

Furthermore, the keyboard, text, or voice search interface may include a search or text input element 236, a keyboard 237 presented to facilitate text input using a controller 105, pointing device, or other input device, and a voice input selectable option 238. For example, the search or text input element 236 and keyboard 237 may facilitate entry of keywords, search terms, or other text to search or browse a catalog of furniture, furnishings, or other objects within the virtual reality environment. In addition, the voice input selectable option 238 may facilitate receiving audio input or speech including keywords or search terms to search or browse a catalog of furniture, furnishings, or other objects within the virtual reality environment. In example embodiments, the search results of the textual or voice search instructions or commands may be presented as two-dimensional grid view user interfaces and/or three-dimensional side-by-side view user interfaces as further described herein.

Moreover, in some example embodiments, a dynamic container 207 may also be presented within the virtual reality environment. The dynamic container 207 may be attached or associated with a controller 105, and/or the dynamic container 207 may be placed, moved, oriented, or otherwise manipulated within the virtual reality environment. Various furniture, furnishings, fixtures, or other objects may be selected, moved, and placed into the dynamic container 207 to facilitate various operations, such as searching, browsing, viewing, evaluating, comparing, or other actions related to one or more objects within the virtual reality environment. Further, the dynamic container 207 may include various characteristics that may be modifiable by a user within the virtual reality environment, such as size, shape, position, orientation, a scale of objects placed therein, a number of objects placed therein, a spacing of objects placed therein, or other characteristics. Additional details associated with the dynamic container 207 are further described herein, at least with respect to FIG. 9.

Figure 3:
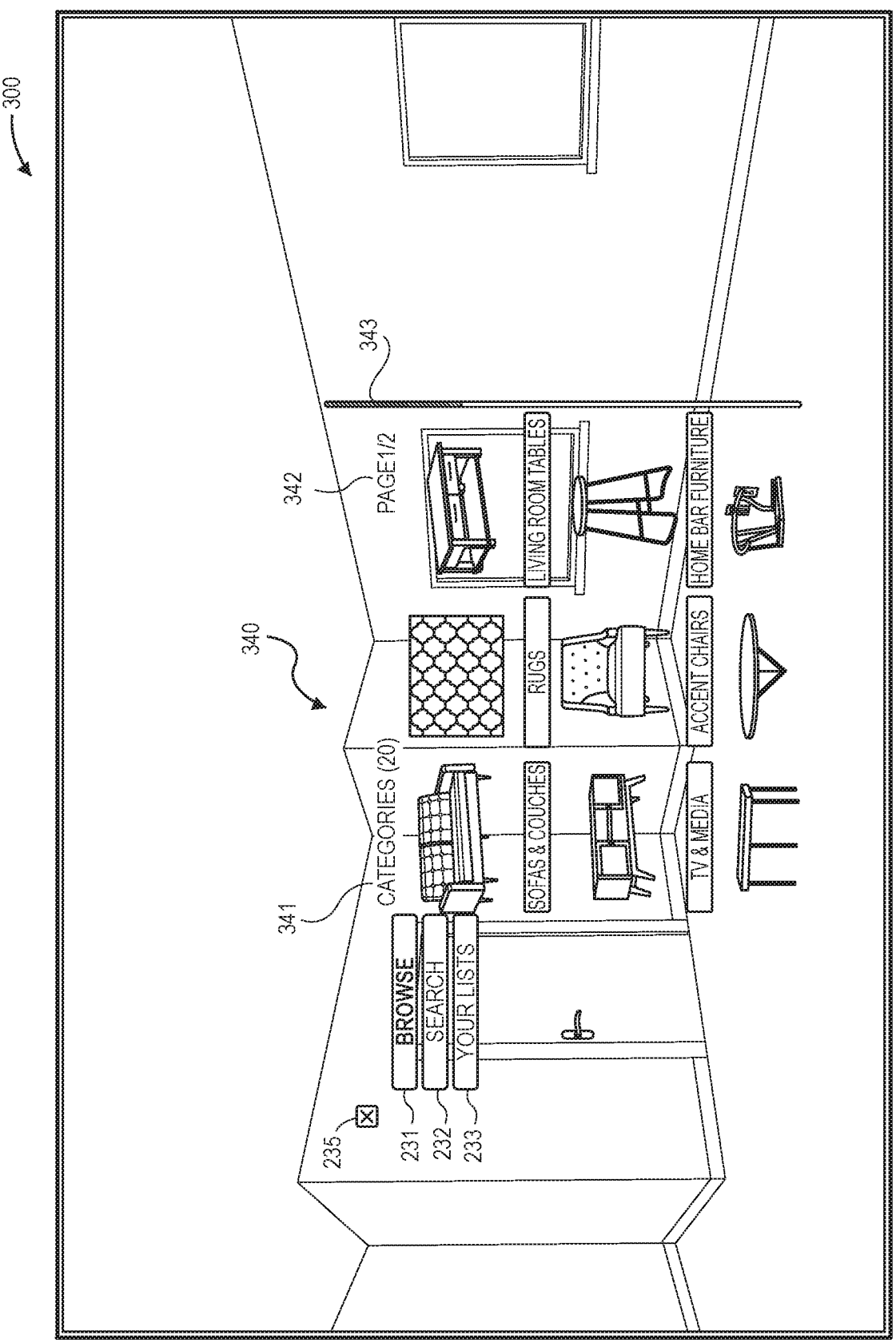
FIG. 3 is a schematic diagram of an example two-dimensional grid, category interface for a virtual reality environment, in accordance with implementations of the present disclosure.

FIG. 3 is a schematic diagram 300 of an example two-dimensional grid, category interface for a virtual reality environment, in accordance with implementations of the present disclosure.

As shown in FIG. 3, upon selection of the search products 124 option as shown in FIG. 1, or upon initiation of a browse function via other inputs or selections within the virtual reality environment, such as the browse button 231 shown in FIGS. 2 and 3, an example browse interface 340 may be presented to a user within the virtual reality environment. Although not illustrated in FIG. 3, upon initiation of a browse function within the virtual reality environment, one or more selectable options associated with the menu 110 that may be attached or associated with the controller 105 may change. For example, as shown in FIG. 2, additional selectable options may include a find products button 215 and an edit room button 216. Various other selectable options may also be included in the menu 110, as further described herein.

For example, the find products button 215 may present the example search interface 230, such as the view shown in FIG. 2, or may present the example browse interface 340, such as the view shown in FIG. 3. In addition, the edit room button 216 may also present various category or catalog browse or search interfaces for fixtures or other objects as two-dimensional grid view user interfaces and/or three-dimensional side-by-side view user interfaces, as further described herein. Moreover, the edit room button 216 may also enable a user to modify aspects of a room or space within the virtual reality environment, such as doors, windows, floors, walls, ceilings, dimensions, or other aspects of a room or space.

As shown in FIG. 3, the example browse interface 340 may include a plurality of selectable options in a left hand column or panel, and a category or catalog browse interface for furniture, furnishings, or other objects presented as a two-dimensional grid view user interface in a middle column or panel. The plurality of selectable options may include a browse button 231, a search button 232, a view lists button 233, and a close button 235. Various other selectable options may also be included in the example browse interface 340, as further described herein.

In addition, the left hand column or panel and the middle column or panel may be associated with a same plane or surface that is presented at a defined distance in front of a user position within the virtual reality environment. Alternatively, the left hand column or panel and the middle column or panel may be angled relative to each other and associated with different planes or surfaces, and each plane or surface may be presented at a defined distance in front of a user position and substantially facing or angled toward a user position within the virtual reality environment, e.g., such that the left hand column or panel and the middle column or panel form an approximate arc or curve around a user position. Further, the example browse interface 340 may be presented as overlaying the virtual reality environment, e.g., overlaying a room or space within the virtual reality environment, and the room or space may be presented as darkened, dimmed, or grayed out in order to facilitate user focus and interaction with the example browse interface 340.

For example, the browse button 231 may present various category or catalog browse or search interfaces for furniture, furnishings, fixtures, or other objects as two-dimensional grid view user interfaces, such as the view shown in FIG. 3, and/or three-dimensional side-by-side view user interfaces, as further described herein. In addition, the search button 232 may present the example search interface 230, such as the view shown in FIG. 2. Further, the view lists button 233 may present various lists or groups of furniture, furnishings, or other objects, whether designed or curated by others or generated by a user, as two-dimensional grid view user interfaces and/or three-dimensional side-by-side view user interfaces, as further described herein. In addition, the close button 235 may cause the browse interface 340 to be closed and no longer presented to a user within the virtual reality environment.

Furthermore, the category or catalog browse interface for furniture, furnishings, or other objects may include a current view indication 341 of a currently presented category or portion of a catalog, a page indication 342, a scroll bar 343, page forward and page back buttons (not shown), and a two-dimensional grid view user interface including a plurality of objects associated with the different categories or portions of a catalog. For example, the current view indication 341 may present information related to a currently presented portion of a catalog, such as a number of categories, a current category or subcategory, and/or a breadcrumb trail within the catalog of objects. The page indication 342 may present information related to a total number of pages of a currently presented portion of a catalog, as well as a page number associated with the currently presented page of the catalog. In addition, the scroll bar 343 may present information related to a currently viewable portion of the currently presented page of the catalog. Further, the page forward and page back buttons, which may be presented upon scrolling toward a bottom of the currently presented page, may cause presentation of different pages of a currently presented portion of a catalog.

The two-dimensional grid view user interface may include a substantially flat, two-dimensional grid presenting a plurality of categories, subcategories, or objects, including furniture, furnishings, fixtures, or other objects. For example, the substantially flat, two-dimensional grid may be presented as aligned along a vertical surface within a field of view of a user and at a defined distance in front of a user position of the user. In one example coordinate system, an x-axis may extend left-right and substantially horizontally across a field of view of a user, a y-axis may extend up-down and substantially vertically across a field of view of a user, and a z-axis may extend in-out and substantially horizontally toward or away from a user position of a user, and each of the x-axis, y-axis, and z-axis may be substantially orthogonal to each other. With reference to this example coordinate system, the vertical surface along which the substantially flat, two-dimensional grid may be aligned may extend along a plane parallel to that defined by the x-axis and the y-axis. In some example embodiments, the vertical surface may be substantially flat or planar. In other example embodiments, the vertical surface may have a curvature around the user position of the user, as described in more detail in U.S. application Ser. Nos. 15/716,268 and 15/716,320, filed Sep. 26, 2017, the contents of which are herein incorporated by reference in their entirety.

As shown in FIG. 3, a plurality of categories of objects is shown, including sofas and couches, rugs, living room tables, TV and media, accent chairs, home bar furniture, etc. Each of the plurality of categories, subcategories, or objects may be presented as a two-dimensional image or a three-dimensional model that is associated with each of the categories, subcategories, or objects. In addition, each of the two-dimensional images or three-dimensional models associated with categories, subcategories, or objects that are presented within the two-dimensional grid may be reduced in size as compared to an actual size upon placement of the objects within a room or space of the virtual reality environment, and may be arranged in a desired format, e.g., in respective positions, locations, or boxes within the two-dimensional grid. In one example, the reduced size of objects presented within the two-dimensional grid may occupy a first percentage of a field of view, e.g., 5, 10, or other percentage, and the actual size of objects presented within the room or space may occupy a second percentage of the field of view that is larger than the first percentage, e.g., 15, 20, or other percentage. In another example, the reduced size of objects presented within the two-dimensional grid may be scaled down by a defined percentage, e.g., 15, 30, 50, or other percentage of the actual size of objects presented within the room or space. In a further example, the reduced size of objects presented within the two-dimensional grid may be scaled down by a defined percentage, e.g., 15, 30, 50, or other percentage of the actual size of objects presented within the room or space, based on a size of a position, location, container, or box within which the object is presented within the two-dimensional grid. Further, each of the categories, subcategories, or objects that are presented within the two-dimensional grid may also include one or more details or information that are presented in association with the categories, subcategories, or objects, such as user ratings, number of positive or negative user reviews or ratings, shipping or delivery options, seller, brand, or manufacturer information, or various other details or information associated with the categories, subcategories, or objects.

In some example embodiments, to improve user experience, the two-dimensional grid view user interface may initially be presented with two-dimensional images that may be processed and presented relatively quickly, and upon processing or loading associated three-dimensional models, the three-dimensional models may replace the two-dimensional images within the two-dimensional grid view user interface to provide a more immersive, three-dimensional experience within the virtual reality environment. In other example embodiments, a user may set or select a preference or default setting for either two-dimensional images or three-dimensional models to be presented via the two-dimensional grid view user interface.

In example embodiments, the plurality of categories, subcategories, or objects presented via the two-dimensional grid view user interface may be presented in a same relative scale, such that sofas, chairs, tables, or other categories, subcategories, or objects that are presented together via the two-dimensional grid view user interface may be viewed, evaluated, or compared in a same relative scale. In other example embodiments, the plurality of categories, subcategories, or objects presented via the two-dimensional grid view user interface may be presented in different relative scales, such that categories, subcategories, or objects of different sizes that are presented together via the two-dimensional grid view user interface may be viewable and recognizable in their different relative scales.

Although not illustrated in FIG. 3, in some example embodiments, a dynamic container 207 may also be presented within the virtual reality environment. The dynamic container 207 may be attached or associated with a controller 105, and/or the dynamic container 207 may be placed, moved, oriented, or otherwise manipulated within the virtual reality environment. Various furniture, furnishings, fixtures, or other objects may be selected, moved, and placed into the dynamic container 207 to facilitate various operations, such as searching, browsing, viewing, evaluating, comparing, or other actions related to one or more objects within the virtual reality environment. Further, the dynamic container 207 may include various characteristics that may be modifiable by a user within the virtual reality environment, such as size, shape, position, orientation, a scale of objects placed therein, a number of objects placed therein, a spacing of objects placed therein, or other characteristics. Additional details associated with the dynamic container 207 are further described herein, at least with respect to FIG. 9.

Figure 4:
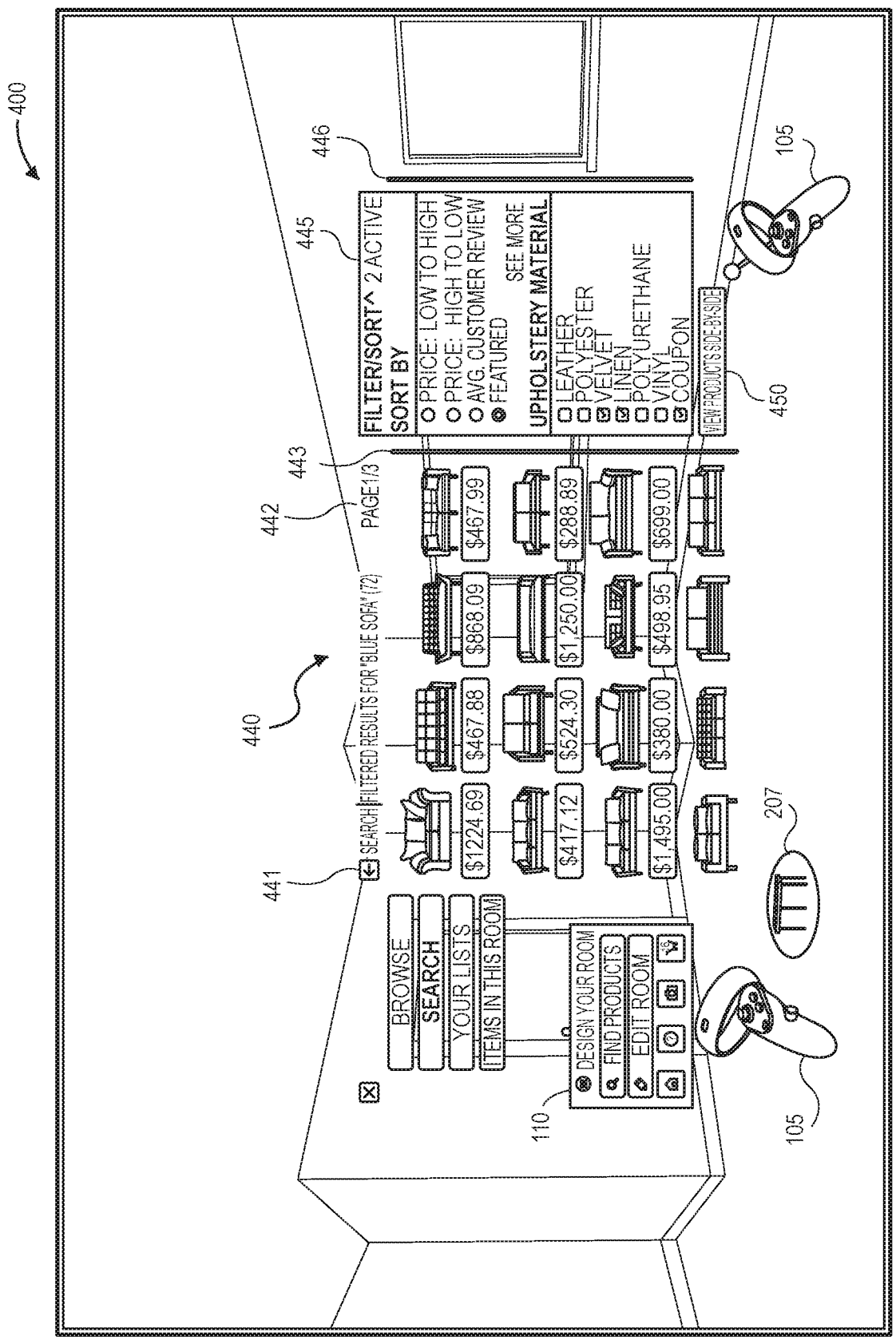
FIG. 4 is a schematic diagram of an example two-dimensional grid, object interface including a dynamic container for a virtual reality environment, in accordance with implementations of the present disclosure.

FIG. 4 is a schematic diagram 400 of an example two-dimensional grid, object interface including a dynamic container for a virtual reality environment, in accordance with implementations of the present disclosure.

As shown in FIG. 4, upon selection of the search products 124 option as shown in FIG. 1, upon initiation of a browse function via other inputs or selections within the virtual reality environment, such as the browse button 231 shown in FIGS. 2 and 3, and/or upon selection of a category and/or subcategory of objects presented via a two-dimensional grid view user interface, such as the view shown in FIG. 3, an example browse interface 440 including a plurality of objects may be presented to a user within the virtual reality environment. Upon initiation of a browse function within the virtual reality environment, one or more selectable options associated with the menu 110 that may be attached or associated with the controller 105 may change. For example, as described herein, additional selectable options may include a find products button and an edit room button. Various other selectable options may also be included in the menu 110, as further described herein.

As shown in FIG. 4, the example browse interface 440 may include a plurality of selectable options in a left hand column or panel, an object browse interface for furniture, furnishings, or other objects presented as a two-dimensional grid view user interface in a middle column or panel, and a plurality of filter options in a right hand column or panel. As described herein, the plurality of selectable options may include a browse button, a search button, a lists button, an items in this room button, and a close button. Various other selectable options may also be included in the example browse interface 440, as further described herein.

In addition, the left hand column or panel, the middle column or panel, and the right hand column or panel may be associated with a same plane or surface that is presented at a defined distance in front of a user position within the virtual reality environment. Alternatively, the left hand column or panel, the middle column or panel, and the right hand column or panel may be angled relative to each other and associated with different planes or surfaces, and each plane or surface may be presented at a defined distance in front of a user position and substantially facing or angled toward a user position within the virtual reality environment, e.g., such that the left hand column or panel, the middle column or panel, and the right hand column or panel form an approximate arc or curve around a user position. Further, the example browse interface 440 may be presented as overlaying the virtual reality environment, e.g., overlaying a room or space within the virtual reality environment, and the room or space may be presented as darkened, dimmed, or grayed out in order to facilitate user focus and interaction with the example browse interface 440.

The object browse interface for furniture, furnishings, or other objects may include a back button and current view indication 441 of a currently presented group or list of objects, a page indication 442, a scroll bar 443, page forward and page back buttons (not shown), and a two-dimensional grid view user interface including a plurality of objects associated with the currently presented group or list of objects. For example, the back button and current view indication 441 may present information related to a currently presented group or list of objects, such as a keywords or search terms, a current category and/or subcategory, a number of objects, and/or a breadcrumb trail within the catalog of objects, and may enable a user to return to previous presentations of the interface via the back button. The page indication 442 may present information related to a total number of pages of a currently presented group or list of objects, as well as a page number associated with the currently presented page of the group or list of objects. In addition, the scroll bar 443 may present information related to a currently viewable portion of the currently presented page of the group or list of objects. Further, the page forward and page back buttons, which may be presented upon scrolling toward a bottom of the currently presented page, may cause presentation of different pages of a currently presented group or list of objects.

The two-dimensional grid view user interface may include a substantially flat, two-dimensional grid presenting a plurality of objects, including furniture, furnishings, fixtures, or other objects. For example, the substantially flat, two-dimensional grid may be presented as aligned along a vertical surface within a field of view of a user and at a defined distance in front of a user position of the user. In one example coordinate system, an x-axis may extend left-right and substantially horizontally across a field of view of a user, a y-axis may extend up-down and substantially vertically across a field of view of a user, and a z-axis may extend in-out and substantially horizontally toward or away from a user position of a user, and each of the x-axis, y-axis, and z-axis may be substantially orthogonal to each other. With reference to this example coordinate system, the vertical surface along which the substantially flat, two-dimensional grid may be aligned may extend along a plane parallel to that defined by the x-axis and the y-axis. In some example embodiments, the vertical surface may be substantially flat or planar. In other example embodiments, the vertical surface may have a curvature around the user position of the user, as described in more detail in U.S. application Ser. Nos. 15/716,268 and 15/716,320, filed Sep. 26, 2017, the contents of which are herein incorporated by reference in their entirety.

As shown in FIG. 4, a plurality of objects is shown, including various different types of sofas and couches. Each of the plurality of objects may be presented as a two-dimensional image or a three-dimensional model that is associated with each of the objects. In addition, each of the two-dimensional images or three-dimensional models associated with objects that are presented within the two-dimensional grid may be reduced in size as compared to an actual size upon placement of the objects within a room or space of the virtual reality environment or upon presentation of the objects in a three-dimensional side-by-side view, and may be arranged in a desired format, e.g., in respective positions, locations, or boxes within the two-dimensional grid. In one example, the reduced size of objects presented within the two-dimensional grid may occupy a first percentage of a field of view, e.g., 5, 10, or other percentage, and the actual size of objects presented within the room or space or presented in a three-dimensional side-by-side view may occupy a second percentage of the field of view that is larger than the first percentage, e.g., 15, 20, or other percentage. In another example, the reduced size of objects presented within the two-dimensional grid may be scaled down by a defined percentage, e.g., 15, 30, 50, or other percentage of the actual size of objects presented within the room or space or presented in a three-dimensional side-by-side view. In a further example, the reduced size of objects presented within the two-dimensional grid may be scaled down by a defined percentage, e.g., 15, 30, 50, or other percentage of the actual size of objects presented within the room or space or presented in a three-dimensional side-by-side view, based on a size of a position, location, container, or box within which the object is presented within the two-dimensional grid and based on a larger size of a position, location, container, or box within which the object is presented within the three-dimensional side-by-side view. Further, each of the objects that are presented within the two-dimensional grid may also include one or more details or information that are presented in association with the objects, such as price, user rating, number of positive or negative user reviews or ratings, shipping or delivery options, seller, brand, or manufacturer information, material, color, dimensions, or any other aspect or characteristic of the object.

In some example embodiments, to improve user experience, the two-dimensional grid view user interface may initially be presented with two-dimensional images that may be processed and presented relatively quickly, and upon processing or loading associated three-dimensional models, the three-dimensional models may replace the two-dimensional images within the two-dimensional grid view user interface to provide a more immersive, three-dimensional experience within the virtual reality environment. In other example embodiments, a user may set or select a preference or default setting for either two-dimensional images or three-dimensional models to be presented via the two-dimensional grid view user interface.

In example embodiments, the plurality of objects presented and arranged via the two-dimensional grid view user interface may be presented in a same relative scale, such that the various objects that are presented together via the two-dimensional grid view user interface may be viewed, evaluated, or compared in a same relative scale. In other example embodiments, the plurality of objects presented and arranged via the two-dimensional grid view user interface may be presented in different relative scales, such that the various objects of different sizes that are presented together via the two-dimensional grid view user interface may be viewable and recognizable in their different relative scales.

The plurality of filter options in the right hand column or panel may include various filters 445, a scroll bar 446, and a view products side-by-side button 450. The various filters 445 may include aspects or characteristics associated with one or more objects presented via the two-dimensional grid view user interface, such as sort by, price, user rating, brand, type, category, style, size, shape, dimensions, mass, weight, volume, color, texture, pattern, material, availability, purchase options, shipping options, or other aspects or characteristics of objects. For example, responsive to selection of one or more filters, the plurality of objects presented via the two-dimensional grid view user interface may be modified based on the selected filters. In addition, the scroll bar 446 may present information related to a currently viewable portion of the various filters 445.

Further, the view products side-by-side button 450 may cause presentation of a three-dimensional side-by-side view user interface of the plurality of objects currently presented via the two-dimensional grid view user interface. For example, responsive to selection of the view products side-by-side button 450, the presentation of the plurality of objects may transition from the two-dimensional grid view user interface, such as the view shown in FIG. 4, to a three-dimensional side-by-side view user interface, such as the view shown and described at least with respect to FIG. 8. The three-dimensional side-by-side view user interface may provide an even more immersive, three-dimensional experience to facilitate evaluation and comparison of a plurality of objects by a user within a virtual reality environment.

Moreover, in some example embodiments, a dynamic container 207 may also be presented within the virtual reality environment. The dynamic container 207 may be attached or associated with a controller 105, and/or the dynamic container 207 may be placed, moved, oriented, or otherwise manipulated within the virtual reality environment. Various furniture, furnishings, fixtures, or other objects may be selected, moved, and placed into the dynamic container 207 to facilitate various operations, such as searching, browsing, viewing, evaluating, comparing, or other actions related to one or more objects within the virtual reality environment. Further, the dynamic container 207 may include various characteristics that may be modifiable by a user within the virtual reality environment, such as size, shape, position, orientation, a scale of objects placed therein, a number of objects placed therein, a spacing of objects placed therein, or other characteristics. Additional details associated with the dynamic container 207 are further described herein, at least with respect to FIG. 9.

Using the two-dimensional grid view user interface, various user interactions with each of the plurality of objects may be enabled to facilitate viewing, browsing, selecting, evaluating, and comparing of objects. For example, responsive to receiving a hover indication with respect to an object, e.g., based on directing or aiming a pointing device associated with the controller 105 onto an object, at least one additional detail associated with the object may be presented, such as a price, user rating, brand, material, color, dimensions, or any other aspect or characteristic of the object. In some example embodiments, the additional details that may be presented upon receiving a hover indication may be additional details that are related to one or more filters selected by a user. For example, if a user selected one or more filters related to materials, the additional details that may be presented upon receiving a hover indication may be related to materials included in the object. In addition, a visual presentation of the object may be modified responsive to the hover indication, such as by highlighting, outlining, pulsing, changing size, or other visual indications.

In addition, responsive to receiving a selection input with respect to an object, e.g., based on selection input via an input element associated with the controller 105, various additional details associated with the object may be presented, such as a price, user rating, brand, material, color, dimensions, or any other aspect or characteristic of the object. Various aspects of the additional details that may be presented upon receiving a selection input are described in more detail at least with respect to FIG. 5.

Further, responsive to receiving a grasping input with respect to an object, e.g., based on a grasping or grabbing input via an input element associated with the controller 105, a three-dimensional model of the object may be placed within the virtual reality environment, e.g., within the room or space of the virtual reality environment. For example, responsive to receiving the grasping input with respect to an object, the two-dimensional grid view user interface may fade or no longer be presented, a three-dimensional model of the object may be attached to, held, moved, and/or oriented using the controller within the virtual reality environment, the three-dimensional model of the object may increase in size to an actual size relative to the room or space of the virtual reality environment, and the object may be placed within the room or space by a user, e.g., based on a release or placement input via an input element associated with the controller.

Figure 5:
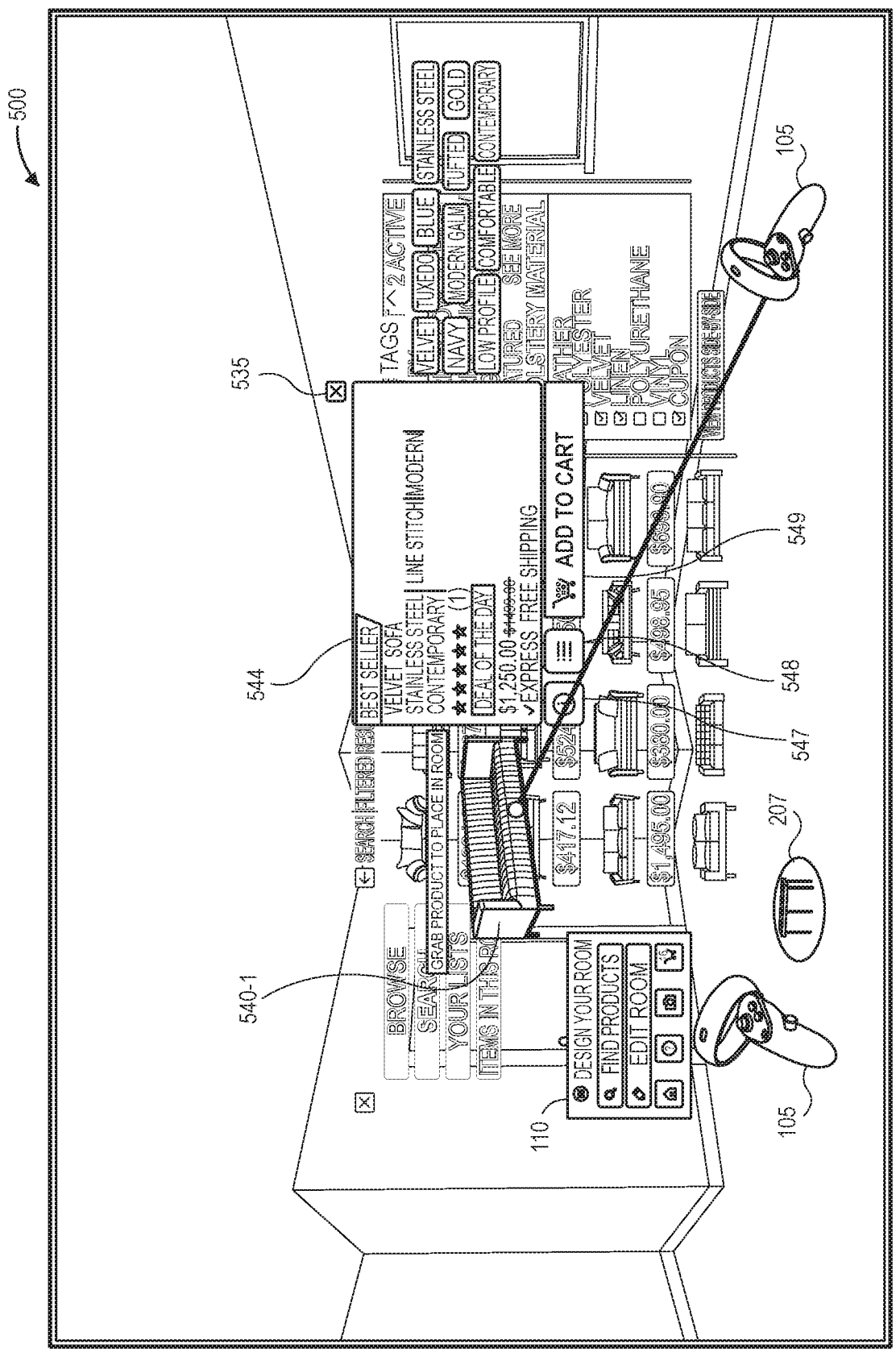
FIG. 5 is a schematic diagram of an example object selection interface including a dynamic container for a virtual reality environment, in accordance with implementations of the present disclosure.

FIG. 5 is a schematic diagram 500 of an example object selection interface including a dynamic container for a virtual reality environment, in accordance with implementations of the present disclosure.

As described above, responsive to receiving a selection input with respect to an object, e.g., based on selection input via an input element associated with the controller 105, from a plurality of objects presented via a two-dimensional grid view user interface, such as the view shown in FIG. 4, various additional details associated with the object may be presented, such as a price, user rating, brand, material, color, dimensions, or any other aspect or characteristic of the object. In addition, responsive to receiving a selection input with respect to an object presented via the two-dimensional grid view user interface, a current object within the virtual reality environment may be replaced or swapped with the selected object. For example, if the two-dimensional grid view user interface is being presented to view objects similar to an object currently presented in the room or space, the selection input may cause replacement or swapping of the currently presented object in the room or space with the selected object.

In the example shown in FIG. 5, upon receiving a selection input with respect to an object, e.g., a particular sofa included in the two-dimensional grid view user interface of FIG. 4, the additional details associated with the selected object may include a three-dimensional model 540-1 of the selected object, a detail card 544 associated with the selected object, a plurality of selectable options, such as a full details button 547, an add to list button 548, an add to shopping cart button 549, and a close button 535, and/or a plurality of filters or tags associated with the selected object. In addition, the three-dimensional model 540-1, the detail card 544, and the selectable options may be presented as overlaying the two-dimensional grid view user interface and the virtual reality environment, e.g., overlaying a room or space within the virtual reality environment, and the two-dimensional grid view user interface and the room or space may be presented as darkened, dimmed, or grayed out in order to facilitate user focus and interaction with the additional details associated with the selected object.

The three-dimensional model 540-1 may be presented as a static or moving, e.g., rotating, model of the selected object. In addition, the three-dimensional model may be manipulated or interacted with by a user, e.g., to rotate, zoom, pan, or otherwise modify a view of the three-dimensional model. Further, in some example embodiments, the three-dimensional model may include various animations, e.g., related to key or interesting features of the selected object. In some example embodiments, to improve user experience, the additional details may initially be presented with a two-dimensional image of the selected object that may be processed and presented relatively quickly, and upon processing or loading an associated three-dimensional model, the three-dimensional model may replace the two-dimensional image within the additional details to provide a more immersive, three-dimensional experience within the virtual reality environment. In other example embodiments, a user may set or select a preference or default setting for either two-dimensional images or three-dimensional models to be presented via the additional details.

The detail card 544 may include additional details associated with the selected object, such as badges, e.g., "Best Seller," name, materials, style, price, user rating, availability information, shipping information, or other aspects or characteristics of the selected object. In addition, the full details button 547 may present a product detail page associated with the selected object that may include images, videos, all additional details, product options, user reviews, brand or manufacturer information, similar, related, or recommended products, or other information and details. The add to list button 548 may enable a user to add the selected object to one or more lists that may be provided to or generated by a user. The add to shopping cart button 549 may enable a user to add the selected object to a shopping cart or list including objects for potential purchase. In addition, the close button 535 may cause the additional details to be closed and no longer presented to a user within the virtual reality environment, such that the two-dimensional grid view user interface from which the object was selected is again presented to the user within the virtual reality environment.

Moreover, in some example embodiments, a dynamic container 207 may also be presented within the virtual reality environment. The dynamic container 207 may be attached or associated with a controller 105, and/or the dynamic container 207 may be placed, moved, oriented, or otherwise manipulated within the virtual reality environment. Various furniture, furnishings, fixtures, or other objects may be selected, moved, and placed into the dynamic container 207 to facilitate various operations, such as searching, browsing, viewing, evaluating, comparing, or other actions related to one or more objects within the virtual reality environment. Further, the dynamic container 207 may include various characteristics that may be modifiable by a user within the virtual reality environment, such as size, shape, position, orientation, a scale of objects placed therein, a number of objects placed therein, a spacing of objects placed therein, or other characteristics. Additional details associated with the dynamic container 207 are further described herein, at least with respect to FIG. 9.

Further, responsive to receiving a grasping input with respect to a selected object presented with additional details as shown in FIG. 5, e.g., based on a grasping or grabbing input via an input element associated with the controller 105, the three-dimensional model of the object may be placed within the virtual reality environment, e.g., within the room or space of the virtual reality environment. For example, responsive to receiving the grasping input with respect to an object, the additional details and the two-dimensional grid view user interface may fade or no longer be presented, the three-dimensional model of the object may be attached to, held, moved, and/or oriented using the controller within the virtual reality environment, the three-dimensional model of the object may increase in size to an actual size relative to the room or space of the virtual reality environment, and the object may be placed within the room or space by a user, e.g., based on a release or placement input via an input element associated with the controller.

Figure 6:
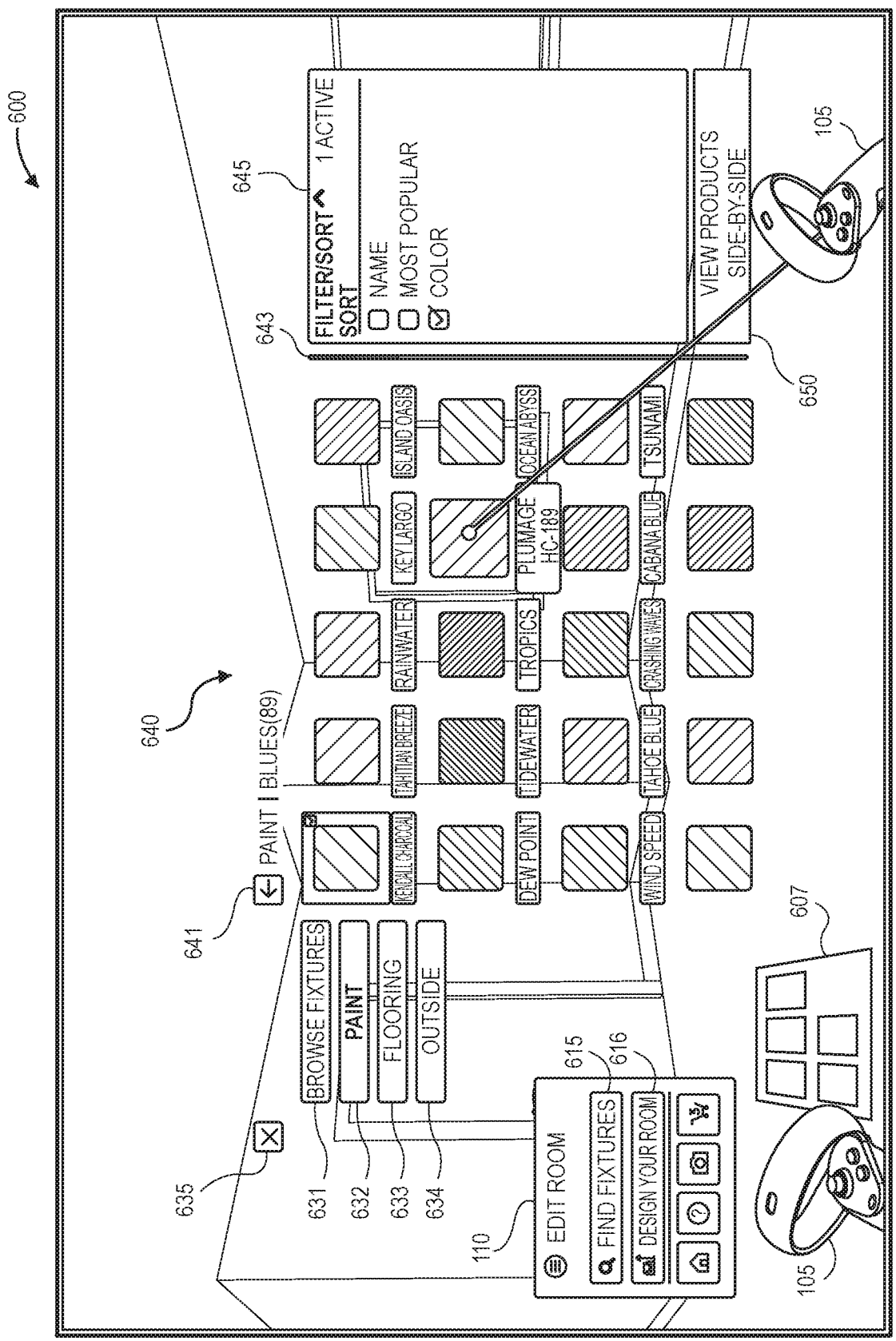
FIG. 6 is a schematic diagram of another example two-dimensional grid, object interface including a dynamic container for a virtual reality environment, in accordance with implementations of the present disclosure.

FIG. 6 is a schematic diagram 600 of another example two-dimensional grid, object interface including a dynamic container for a virtual reality environment, in accordance with implementations of the present disclosure.

As shown in FIG. 6, upon selection of the search products 124 option as shown in FIG. 1, upon initiation of a browse function via other inputs or selections within the virtual reality environment, such as the browse button 231 shown in FIGS. 2 and 3, and/or upon selection of a category and/or subcategory of objects presented via a two-dimensional grid view user interface, such as the view shown in FIG. 3, an example browse interface 640 including a plurality of objects, e.g., fixtures, may be presented to a user within the virtual reality environment. Upon initiation of a browse function within the virtual reality environment, one or more selectable options associated with the menu 110 that may be attached or associated with the controller 105 may change. For example, additional selectable options may include a find fixtures button 615 and a design your room 616 button. Various other selectable options may also be included in the menu 110, as further described herein.

For example, the find fixtures button 615 may present the example search interface 230, such as the view shown in FIG. 2, or may present various category or catalog browse or search interfaces for fixtures or other objects as two-dimensional grid view user interfaces and/or three-dimensional side-by-side view user interfaces, as further described herein, such as the views shown in FIG. 3 or 6. In addition, the design your room button 616 may also present various category or catalog browse or search interfaces for furniture, furnishings, or other objects as two-dimensional grid view user interfaces and/or three-dimensional side-by-side view user interfaces, as further described herein, such as the views shown in FIGS. 2-4.

As shown in FIG. 6, the example browse interface 640 may include a plurality of selectable options in a left hand column or panel, an object browse interface for fixtures or other objects presented as a two-dimensional grid view user interface in a middle column or panel, and a plurality of filter options in a right hand column or panel. The plurality of selectable options may include a browse fixtures button 631, a paint button 632, a flooring button 633, an outside or environment button 634, and a close button 635. Various other selectable options may also be included in the example browse interface 640, as further described herein.

In addition, the left hand column or panel, the middle column or panel, and the right hand column or panel may be associated with a same plane or surface that is presented at a defined distance in front of a user position within the virtual reality environment. Alternatively, the left hand column or panel, the middle column or panel, and the right hand column or panel may be angled relative to each other and associated with different planes or surfaces, and each plane or surface may be presented at a defined distance in front of a user position and substantially facing or angled toward a user position within the virtual reality environment, e.g., such that the left hand column or panel, the middle column or panel, and the right hand column or panel form an approximate arc or curve around a user position. Further, the example browse interface 640 may be presented as overlaying the virtual reality environment, e.g., overlaying a room or space within the virtual reality environment, and the room or space may be presented as darkened, dimmed, or grayed out in order to facilitate user focus and interaction with the example browse interface 640. In alternative embodiments, the room or space may not be presented as darkened, dimmed, or grayed out when the example browse interface 640 is presented as overlaying the virtual reality environment to facilitate viewing and evaluation of changes to fixtures within the room or space responsive to user interactions with the example browse interface 640.

For example, the browse fixtures button 631 may present various category or catalog browse or search interfaces for fixtures or other objects as two-dimensional grid view user interfaces and/or three-dimensional side-by-side view user interfaces, as further described herein. In addition, the paint button 632 may present various category or catalog browse or search interfaces for different types of paints, e.g., to be applied to walls or other environment surfaces, as two-dimensional grid view user interfaces and/or three-dimensional side-by-side view user interfaces, as further described herein, such as the view shown in FIG. 6. Further, the flooring button 633 may present various category or catalog browse or search interfaces for different types of flooring, e.g., to be applied to floors or other environment surfaces, as two-dimensional grid view user interfaces and/or three-dimensional side-by-side view user interfaces, as further described herein. Similarly, the outside button 634 may present various category or catalog browse or search interfaces for different types of exterior or environment images, e.g., to be viewed through doors or windows in the environment, as two-dimensional grid view user interfaces and/or three-dimensional side-by-side view user interfaces, as further described herein. In addition, the close button 635 may cause the browse interface 640 to be closed and no longer presented to a user within the virtual reality environment.

The object browse interface for fixtures or other objects may include a back button and current view indication 641 of a currently presented group or list of objects, a page indication (not shown), a scroll bar 643, page forward and page back buttons (not shown), and a two-dimensional grid view user interface including a plurality of objects associated with the currently presented group or list of objects. For example, the back button and current view indication 641 may present information related to a currently presented group or list of objects, such as a keywords or search terms, a current category and/or subcategory, a number of objects, and/or a breadcrumb trail within the catalog of objects, and may enable a user to return to previous presentations of the interface via the back button. The page indication may present information related to a total number of pages of a currently presented group or list of objects, as well as a page number associated with the currently presented page of the group or list of objects. In addition, the scroll bar 643 may present information related to a currently viewable portion of the currently presented page of the group or list of objects. Further, the page forward and page back buttons, which may be presented upon scrolling toward a bottom of the currently presented page, may cause presentation of different pages of a currently presented group or list of objects.

The two-dimensional grid view user interface may include a substantially flat, two-dimensional grid presenting a plurality of objects, including fixtures or other objects. For example, the substantially flat, two-dimensional grid may be presented as aligned along a vertical surface within a field of view of a user and at a defined distance in front of a user position of the user. In one example coordinate system, an x-axis may extend left-right and substantially horizontally across a field of view of a user, a y-axis may extend up-down and substantially vertically across a field of view of a user, and a z-axis may extend in-out and substantially horizontally toward or away from a user position of a user, and each of the x-axis, y-axis, and z-axis may be substantially orthogonal to each other. With reference to this example coordinate system, the vertical surface along which the substantially flat, two-dimensional grid may be aligned may extend along a plane parallel to that defined by the x-axis and the y-axis. In some example embodiments, the vertical surface may be substantially flat or planar. In other example embodiments, the vertical surface may have a curvature around the user position of the user, as described in more detail in U.S. application Ser. Nos. 15/716,268 and 15/716,320, filed Sep. 26, 2017, the contents of which are herein incorporated by reference in their entirety.

As shown in FIG. 6, a plurality of objects is shown, including various different types, colors, shades, or hues of paints. Each of the plurality of objects may be presented as a two-dimensional image or a three-dimensional model that is associated with each of the objects. In addition, each of the two-dimensional images or three-dimensional models associated with objects that are presented within the two-dimensional grid may be reduced in size as compared to an actual size upon placement of the objects within a room or space of the virtual reality environment or upon presentation of the objects in a three-dimensional side-by-side view, and may be arranged in a desired format, e.g., in respective positions, locations, or boxes within the two-dimensional grid. In one example, the reduced size of objects presented within the two-dimensional grid may occupy a first percentage of a field of view, e.g., 5, 10, or other percentage, and the actual size of objects presented within the room or space or presented in a three-dimensional side-by-side view may occupy a second percentage of the field of view that is larger than the first percentage, e.g., 15, 20, or other percentage. In another example, the reduced size of objects presented within the two-dimensional grid may be scaled down by a defined percentage, e.g., 15, 30, 50, or other percentage of the actual size of objects presented within the room or space or presented in a three-dimensional side-by-side view. In a further example, the reduced size of objects presented within the two-dimensional grid may be scaled down by a defined percentage, e.g., 15, 30, 50, or other percentage of the actual size of objects presented within the room or space or presented in a three-dimensional side-by-side view, based on a size of a position, location, container, or box within which the object is presented within the two-dimensional grid and based on a larger size of a position, location, container, or box within which the object is presented within the three-dimensional side-by-side view. Further, each of the objects that are presented within the two-dimensional grid may also include one or more details or information that are presented in association with the objects, such as price, user rating, number of positive or negative user reviews or ratings, shipping or delivery options, seller, brand, or manufacturer information, material, color, dimensions, or any other aspect or characteristic of the object.

In some example embodiments, to improve user experience, the two-dimensional grid view user interface may initially be presented with two-dimensional images that may be processed and presented relatively quickly, and upon processing or loading associated three-dimensional models, the three-dimensional models may replace the two-dimensional images within the two-dimensional grid view user interface to provide a more immersive, three-dimensional experience within the virtual reality environment. In other example embodiments, a user may set or select a preference or default setting for either two-dimensional images or three-dimensional models to be presented via the two-dimensional grid view user interface.

In example embodiments, the plurality of objects presented and arranged via the two-dimensional grid view user interface may be presented in a same relative scale, such that the various objects that are presented together via the two-dimensional grid view user interface may be viewed, evaluated, or compared in a same relative scale. In other example embodiments, the plurality of objects presented and arranged via the two-dimensional grid view user interface may be presented in different relative scales, such that the various objects of different sizes that are presented together via the two-dimensional grid view user interface may be viewable and recognizable in their different relative scales.

The plurality of filter options in the right hand column or panel may include various filters 645, a scroll bar (not shown), and a view products side-by-side button 650. The various filters 645 may include aspects or characteristics associated with one or more objects presented via the two-dimensional grid view user interface, such as sort by, price, user rating, brand, type, category, style, size, shape, dimensions, mass, weight, volume, color, texture, pattern, material, availability, purchase options, shipping options, or other aspects or characteristics of fixtures or objects. For example, responsive to selection of one or more filters, the plurality of objects presented via the two-dimensional grid view user interface may be modified based on the selected filters. In addition, the scroll bar may present information related to a currently viewable portion of the various filters 645.

Further, the view products side-by-side button 650 may cause presentation of a three-dimensional side-by-side view user interface of the plurality of objects currently presented via the two-dimensional grid view user interface. For example, responsive to selection of the view products side-by-side button 650, the presentation of the plurality of objects may transition from the two-dimensional grid view user interface, such as the view shown in FIG. 6, to a three-dimensional side-by-side view user interface, such as the view shown and described at least with respect to FIG. 8. The three-dimensional side-by-side view user interface may provide an even more immersive, three-dimensional experience to facilitate evaluation and comparison of a plurality of objects by a user within a virtual reality environment.

Moreover, in some example embodiments, a dynamic container 607 may also be presented within the virtual reality environment. The dynamic container 607 may be attached or associated with a controller 105, and/or the dynamic container 607 may be placed, moved, oriented, or otherwise manipulated within the virtual reality environment. Various fixtures or other objects may be selected, moved, and placed into the dynamic container 607 to facilitate various operations, such as searching, browsing, viewing, evaluating, comparing, or other actions related to one or more objects within the virtual reality environment. Further, the dynamic container 607 may include various characteristics that may be modifiable by a user within the virtual reality environment, such as size, shape, position, orientation, a scale of objects placed therein, a number of objects placed therein, a spacing of objects placed therein, or other characteristics. Additional details associated with the dynamic container 607 are further described herein, at least with respect to FIG. 9.

Using the two-dimensional grid view user interface, various user interactions with each of the plurality of objects may be enabled to facilitate viewing, browsing, selecting, evaluating, and comparing of objects. For example, responsive to receiving a hover indication with respect to an object, e.g., based on directing or aiming a pointing device associated with the controller 105 onto an object, at least one additional detail associated with the object may be presented, such as a price, user rating, brand, material, color, dimensions, or any other aspect or characteristic of the object. In some example embodiments, the additional details that may be presented upon receiving a hover indication may be additional details that are related to one or more filters selected by a user. For example, if a user selected one or more filters related to materials, the additional details that may be presented upon receiving a hover indication may be related to materials included in the object. In addition, a visual presentation of the object may be modified responsive to the hover indication, such as by highlighting, outlining, pulsing, changing size, or other visual indications.

In addition, responsive to receiving a selection input with respect to an object, e.g., based on selection input via an input element associated with the controller 105, from a plurality of objects presented via a two-dimensional grid view user interface, such as the view shown in FIG. 6, various additional details associated with the object may be presented, such as a price, user rating, brand, material, color, dimensions, or any other aspect or characteristic of the object. In addition, responsive to receiving a selection input with respect to an object presented via the two-dimensional grid view user interface, a current fixture or object within the virtual reality environment may be replaced or swapped with the selected fixture or object. For example, if the two-dimensional grid view user interface is being presented to view fixtures or objects similar to a fixture or object currently presented in the room or space, the selection input may cause replacement or swapping of the currently presented fixture or object in the room or space with the selected fixture or object.

In the example shown in FIG. 6, upon receiving a selection input with respect to an object, e.g., a particular paint swatch included in the two-dimensional grid view user interface of FIG. 6, the additional details associated with the selected object may include, as described at least with respect to FIG. 5, a three-dimensional model of the selected object, a detail card associated with the selected object, a plurality of selectable options, such as a full details button, an add to list button, an add to shopping cart button, and a close button, and/or a plurality of filters or tags associated with the selected object. In addition, the three-dimensional model, the detail card, and the selectable options may be presented as overlaying the two-dimensional grid view user interface and the virtual reality environment, e.g., overlaying a room or space within the virtual reality environment, and the two-dimensional grid view user interface and the room or space may be presented as darkened, dimmed, or grayed out in order to facilitate user focus and interaction with the additional details associated with the selected object. In alternative embodiments, the room or space may not be presented as darkened, dimmed, or grayed out when the additional details are presented as overlaying the virtual reality environment to facilitate viewing and evaluation of changes to fixtures within the room or space responsive to user interactions with the additional details.

The three-dimensional model may be presented as a static or moving, e.g., rotating, model of the selected object. In addition, the three-dimensional model may be manipulated or interacted with by a user, e.g., to rotate, zoom, pan, or otherwise modify a view of the three-dimensional model. Further, in some example embodiments, the three-dimensional model may include various animations, e.g., related to key or interesting features of the selected object. In some example embodiments, to improve user experience, the additional details may initially be presented with a two-dimensional image of the selected object that may be processed and presented relatively quickly, and upon processing or loading an associated three-dimensional model, the three-dimensional model may replace the two-dimensional image within the additional details to provide a more immersive, three-dimensional experience within the virtual reality environment. In other example embodiments, a user may set or select a preference or default setting for either two-dimensional images or three-dimensional models to be presented via the additional details.

The detail card may include additional details associated with the selected object, such as badges, e.g., "Best Seller," name, materials, brand, price, user rating, availability information, shipping information, or other aspects or characteristics of the selected object. In addition, the full details button may present a product detail page associated with the selected object that may include images, videos, all additional details, product options, user reviews, brand or manufacturer information, similar, related, or recommended products, or other information and details. The add to list button may enable a user to add the selected object to one or more lists that may be provided to or generated by a user. The add to shopping cart button may enable a user to add the selected object to a shopping cart or list including objects for potential purchase. In addition, the close button may cause the additional details to be closed and no longer presented to a user within the virtual reality environment, such that the two-dimensional grid view user interface from which the object was selected is again presented to the user within the virtual reality environment.

Further, responsive to receiving a grasping input with respect to an object presented via the two-dimensional grid view user interface or presented with additional details upon selection, e.g., based on a grasping or grabbing input via an input element associated with the controller 105, a three-dimensional model of the fixture or object may be placed or applied within the virtual reality environment, e.g., within the room or space of the virtual reality environment. For example, responsive to receiving the grasping input with respect to a fixture or object, the two-dimensional grid view user interface may fade or no longer be presented, a three-dimensional model of the fixture or object may be attached to, held, moved, and/or oriented using the controller within the virtual reality environment, the three-dimensional model of the fixture or object may increase in size to an actual size relative to the room or space of the virtual reality environment, and the fixture or object may be placed or applied within the room or space by a user, e.g., based on a release or placement input via an input element associated with the controller, thereby applying the fixture or object to the room or space, such as a paint color, a flooring design, an exterior environment, or other fixtures that may be applied to environment surfaces or other portions of the room or space.

Furthermore, although the two-dimensional grid view user interfaces and three-dimensional side-by-side view user interfaces are generally described herein in the context of searching or browsing for furniture, furnishings, fixtures, or other objects, e.g., from a catalog of objects, in other example embodiments, the two-dimensional grid view user interfaces and three-dimensional side-by-side view user interfaces may be used to present objects that are currently present in a room or space, objects that are included in one or more lists or groups of objects, objects that are included in a shopping cart or list, objects that have been placed in one or more dynamic containers, and/or other lists or groups of objects, as well as various other aspects related to user experiences within virtual reality environments, such as user account settings, help topics, saved images or screenshots, or other aspects related to users, user accounts, or virtual reality environments.

Figure 7:
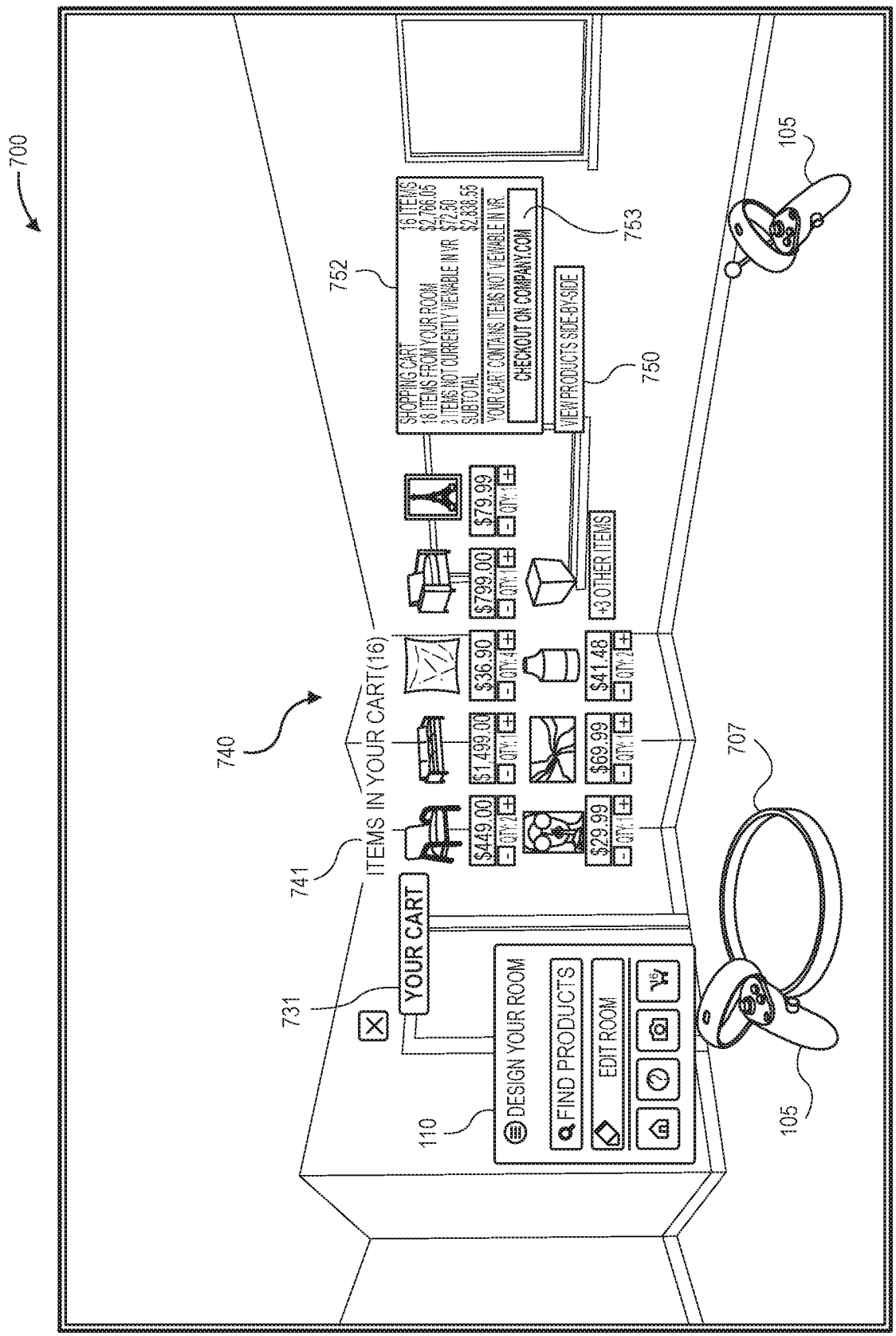
FIG. 7 is a schematic diagram of yet another example two-dimensional grid, object interface including a dynamic container for a virtual reality environment, in accordance with implementations of the present disclosure.

FIG. 7 is a schematic diagram 700 of yet another example two-dimensional grid, object interface including a dynamic container for a virtual reality environment, in accordance with implementations of the present disclosure.

As shown in FIG. 7, upon selection of the shopping cart button 114 associated with the menu 110 as shown in FIG. 1, upon selection of the items in this room button 234 as shown in FIG. 2, upon selection of the lists button 233 as shown in FIGS. 2 and 3, upon selection of the add to list button 548 or the add to shopping cart button 549 as shown in FIG. 5, and/or upon selection of one or more dynamic containers 207, 607, 707, 807, 907 as shown in FIGS. 2 and 4-9, an example browse interface 740 including a plurality of furniture, furnishings, fixtures, or other objects may be presented to a user within the virtual reality environment. In the example shown in FIG. 7, a browse interface 740 for a shopping cart or list generated by a user is illustrated. Upon selection of a group, list, or shopping cart button, one or more selectable options associated with the menu 110 that may be attached or associated with the controller 105 may change. For example, as described herein, additional selectable options may include a find products button and an edit room button. Various other selectable options may also be included in the menu 110, as further described herein.

As shown in FIG. 7, the example browse interface 740 may include a plurality of selectable options in a left hand column or panel, an object browse interface for a plurality of objects presented as a two-dimensional grid view user interface in a middle column or panel, and a group, list, or shopping cart summary in a right hand column or panel. The plurality of selectable options may include a cart button 731 and a close button 735. Various other selectable options may also be included in the example browse interface 740, as further described herein.

In addition, the left hand column or panel, the middle column or panel, and the right hand column or panel may be associated with a same plane or surface that is presented at a defined distance in front of a user position within the virtual reality environment. Alternatively, the left hand column or panel, the middle column or panel, and the right hand column or panel may be angled relative to each other and associated with different planes or surfaces, and each plane or surface may be presented at a defined distance in front of a user position and substantially facing or angled toward a user position within the virtual reality environment, e.g., such that the left hand column or panel, the middle column or panel, and the right hand column or panel form an approximate arc or curve around a user position. Further, the example browse interface 740 may be presented as overlaying the virtual reality environment, e.g., overlaying a room or space within the virtual reality environment, and the room or space may be presented as darkened, dimmed, or grayed out in order to facilitate user focus and interaction with the example browse interface 740.

For example, the cart button 731 may present a plurality of objects included in a group, list, or shopping cart as two-dimensional grid view user interfaces and/or three-dimensional side-by-side view user interfaces, as further described herein, such as the view shown in FIG. 7. In addition, the close button 735 may cause the browse interface 740 to be closed and no longer presented to a user within the virtual reality environment.

The object browse interface for a plurality of objects included in a group, list, or shopping cart may include a current view indication 741 of a currently presented group or list of objects, a page indication (not shown), a scroll bar (not shown), page forward and page back buttons (not shown), and a two-dimensional grid view user interface including a plurality of objects associated with the currently presented group or list of objects. For example, the current view indication 741 may present information related to a currently presented group or list of objects, such as a keywords or search terms, a current category and/or subcategory, a number of objects, and/or a breadcrumb trail within the catalog of objects. The page indication may present information related to a total number of pages of a currently presented group or list of objects, as well as a page number associated with the currently presented page of the group or list of objects. In addition, the scroll bar may present information related to a currently viewable portion of the currently presented page of the group or list of objects. Further, the page forward and page back buttons, which may be presented upon scrolling toward a bottom of the currently presented page, may cause presentation of different pages of a currently presented group or list of objects.

The two-dimensional grid view user interface may include a substantially flat, two-dimensional grid presenting a plurality of objects, including furniture, furnishings, fixtures, or other objects. For example, the substantially flat, two-dimensional grid may be presented as aligned along a vertical surface within a field of view of a user and at a defined distance in front of a user position of the user. In one example coordinate system, an x-axis may extend left-right and substantially horizontally across a field of view of a user, a y-axis may extend up-down and substantially vertically across a field of view of a user, and a z-axis may extend in-out and substantially horizontally toward or away from a user position of a user, and each of the x-axis, y-axis, and z-axis may be substantially orthogonal to each other. With reference to this example coordinate system, the vertical surface along which the substantially flat, two-dimensional grid may be aligned may extend along a plane parallel to that defined by the x-axis and the y-axis. In some example embodiments, the vertical surface may be substantially flat or planar. In other example embodiments, the vertical surface may have a curvature around the user position of the user, as described in more detail in U.S. application Ser. Nos. 15/716,268 and 15/716,320, filed Sep. 26, 2017, the contents of which are herein incorporated by reference in their entirety.

As shown in FIG. 7, a plurality of objects included in a group, list, or shopping cart is shown, including various different furniture, furnishings, fixtures, and other objects. Each of the plurality of objects may be presented as a two-dimensional image or a three-dimensional model that is associated with each of the objects. In addition, each of the two-dimensional images or three-dimensional models associated with objects that are presented within the two-dimensional grid may be reduced in size as compared to an actual size upon placement of the objects within a room or space of the virtual reality environment or upon presentation of the objects in a three-dimensional side-by-side view, and may be arranged in a desired format, e.g., in respective positions, locations, or boxes within the two-dimensional grid. In one example, the reduced size of objects presented within the two-dimensional grid may occupy a first percentage of a field of view, e.g., 5, 10, or other percentage, and the actual size of objects presented within the room or space or presented in a three-dimensional side-by-side view may occupy a second percentage of the field of view that is larger than the first percentage, e.g., 15, 20, or other percentage. In another example, the reduced size of objects presented within the two-dimensional grid may be scaled down by a defined percentage, e.g., 15, 30, 50, or other percentage of the actual size of objects presented within the room or space or presented in a three-dimensional side-by-side view. In a further example, the reduced size of objects presented within the two-dimensional grid may be scaled down by a defined percentage, e.g., 15, 30, 50, or other percentage of the actual size of objects presented within the room or space or presented in a three-dimensional side-by-side view, based on a size of a position, location, container, or box within which the object is presented within the two-dimensional grid and based on a larger size of a position, location, container, or box within which the object is presented within the three-dimensional side-by-side view. Further, each of the objects that are presented within the two-dimensional grid may also include one or more details or information that are presented in association with the objects, such as price, user rating, number of positive or negative user reviews or ratings, shipping or delivery options, seller, brand, or manufacturer information, material, color, dimensions, or any other aspect or characteristic of the object.

In some example embodiments, to improve user experience, the two-dimensional grid view user interface may initially be presented with two-dimensional images that may be processed and presented relatively quickly, and upon processing or loading associated three-dimensional models, the three-dimensional models may replace the two-dimensional images within the two-dimensional grid view user interface to provide a more immersive, three-dimensional experience within the virtual reality environment. In other example embodiments, a user may set or select a preference or default setting for either two-dimensional images or three-dimensional models to be presented via the two-dimensional grid view user interface.

In example embodiments, the plurality of objects presented and arranged via the two-dimensional grid view user interface may be presented in a same relative scale, such that the various objects that are presented together via the two-dimensional grid view user interface may be viewed, evaluated, or compared in a same relative scale. In other example embodiments, the plurality of objects presented and arranged via the two-dimensional grid view user interface may be presented in different relative scales, such that the various objects of different sizes that are presented together via the two-dimensional grid view user interface may be viewable and recognizable in their different relative scales.

The group, list, or shopping cart summary in the right hand column or panel may include summary information 752 related to the objects included in the group, list, or shopping cart, a checkout or purchase button 753, and a view products side-by-side button 750. The summary information 752 may include various information, such as a total number of objects, a total price, availability information, shipping information, or other information related to the objects included in the group, list, or shopping cart. In addition, the purchase button 753 may present information related to completing a purchase of one or more objects included in the group, list, or shopping cart.

Further, the view products side-by-side button 750 may cause presentation of a three-dimensional side-by-side view user interface of the plurality of objects currently presented via the two-dimensional grid view user interface. For example, responsive to selection of the view products side-by-side button 750, the presentation of the plurality of objects may transition from the two-dimensional grid view user interface, such as the view shown in FIG. 7, to a three-dimensional side-by-side view user interface, such as the view shown and described at least with respect to FIG. 8. The three-dimensional side-by-side view user interface may provide an even more immersive, three-dimensional experience to facilitate evaluation and comparison of a plurality of objects by a user within a virtual reality environment.

Moreover, in some example embodiments, a dynamic container 707 may also be presented within the virtual reality environment. The dynamic container 707 may be attached or associated with a controller 105, and/or the dynamic container 707 may be placed, moved, oriented, or otherwise manipulated within the virtual reality environment. Various objects may be selected, moved, and placed into the dynamic container 707 to facilitate various operations, such as searching, browsing, viewing, evaluating, comparing, or other actions related to one or more objects within the virtual reality environment. Further, the dynamic container 707 may include various characteristics that may be modifiable by a user within the virtual reality environment, such as size, shape, position, orientation, a scale of objects placed therein, a number of objects placed therein, a spacing of objects placed therein, or other characteristics. Additional details associated with the dynamic container 707 are further described herein, at least with respect to FIG. 9.

Using the two-dimensional grid view user interface, various user interactions with each of the plurality of objects may be enabled to facilitate viewing, browsing, selecting, evaluating, and comparing of objects. For example, responsive to receiving a hover indication with respect to an object, e.g., based on directing or aiming a pointing device associated with the controller 105 onto an object, at least one additional detail associated with the object may be presented, such as a price, user rating, brand, material, color, dimensions, or any other aspect or characteristic of the object. In some example embodiments, the additional details that may be presented upon receiving a hover indication may be additional details that are related to one or more filters selected by a user. For example, if a user selected one or more filters related to materials, the additional details that may be presented upon receiving a hover indication may be related to materials included in the object. In addition, a visual presentation of the object may be modified responsive to the hover indication, such as by highlighting, outlining, pulsing, changing size, or other visual indications.

In addition, responsive to receiving a selection input with respect to an object, e.g., based on selection input via an input element associated with the controller 105, from a plurality of objects presented via a two-dimensional grid view user interface, such as the view shown in FIG. 7, various additional details associated with the object may be presented, such as a price, user rating, brand, material, color, dimensions, or any other aspect or characteristic of the object. In addition, responsive to receiving a selection input with respect to an object presented via the two-dimensional grid view user interface, a current object within the virtual reality environment may be replaced or swapped with the selected object. For example, if the two-dimensional grid view user interface is being presented to view objects similar to an object currently presented in the room or space, the selection input may cause replacement or swapping of the currently presented object in the room or space with the selected object.

In the example shown in FIG. 7, upon receiving a selection input with respect to an object, e.g., a chair or furnishing included in the two-dimensional grid view user interface of FIG. 7, the additional details associated with the selected object may include, as described at least with respect to FIG. 5, a three-dimensional model of the selected object, a detail card associated with the selected object, a plurality of selectable options, such as a full details button, an add to list button, an add to shopping cart button, and a close button, and/or a plurality of filters or tags associated with the selected object. In addition, the three-dimensional model, the detail card, and the selectable options may be presented as overlaying the two-dimensional grid view user interface and the virtual reality environment, e.g., overlaying a room or space within the virtual reality environment, and the two-dimensional grid view user interface and the room or space may be presented as darkened, dimmed, or grayed out in order to facilitate user focus and interaction with the additional details associated with the selected object.

The three-dimensional model may be presented as a static or moving, e.g., rotating, model of the selected object. In addition, the three-dimensional model may be manipulated or interacted with by a user, e.g., to rotate, zoom, pan, or otherwise modify a view of the three-dimensional model. Further, in some example embodiments, the three-dimensional model may include various animations, e.g., related to key or interesting features of the selected object. In some example embodiments, to improve user experience, the additional details may initially be presented with a two-dimensional image of the selected object that may be processed and presented relatively quickly, and upon processing or loading an associated three-dimensional model, the three-dimensional model may replace the two-dimensional image within the additional details to provide a more immersive, three-dimensional experience within the virtual reality environment. In other example embodiments, a user may set or select a preference or default setting for either two-dimensional images or three-dimensional models to be presented via the additional details.

The detail card may include additional details associated with the selected object, such as badges, e.g., "Best Seller," name, materials, brand, price, user rating, availability information, shipping information, or other aspects or characteristics of the selected object. In addition, the full details button may present a product detail page associated with the selected object that may include images, videos, all additional details, product options, user reviews, brand or manufacturer information, similar, related, or recommended products, or other information and details. The add to list button may enable a user to add the selected object to one or more lists that may be provided to or generated by a user. The add to shopping cart button may enable a user to add the selected object to a shopping cart or list including objects for potential purchase. In addition, the close button may cause the additional details to be closed and no longer presented to a user within the virtual reality environment, such that the two-dimensional grid view user interface from which the object was selected is again presented to the user within the virtual reality environment.

Further, responsive to receiving a grasping input with respect to an object presented via the two-dimensional grid view user interface or presented with additional details upon selection, e.g., based on a grasping or grabbing input via an input element associated with the controller 105, a three-dimensional model of the object may be placed within the virtual reality environment, e.g., within the room or space of the virtual reality environment. For example, responsive to receiving the grasping input with respect to an object, the two-dimensional grid view user interface may fade or no longer be presented, a three-dimensional model of the object may be attached to, held, moved, and/or oriented using the controller within the virtual reality environment, the three-dimensional model of the object may increase in size to an actual size relative to the room or space of the virtual reality environment, and the object may be placed within the room or space by a user, e.g., based on a release or placement input via an input element associated with the controller.

Although the two-dimensional grid view user interfaces described herein may include a plurality of categories, subcategories, or objects in a two-dimensional grid with approximately equal portions or sections, in other example embodiments, various of the plurality of categories, subcategories, or objects included in a two-dimensional grid may have differently sized or shaped portions or sections. For example, a category associated with sofas or couches may occupy a larger width and a shorter height within the two-dimensional grid, and/or a subcategory associated with floor lamps may occupy a larger height and a shorter width within the two-dimensional grid. Various other combinations of shapes and sizes of portions or sections of a two-dimensional grid may be included in the two-dimensional grid view user interfaces described herein.

Furthermore, in some example embodiments, two-dimensional grid view user interfaces may be presented in positions that may interfere with or collide with portions of virtual reality environments, such as walls, floors, ceilings, or other environment surfaces, and/or furniture, furnishings, fixtures, or other objects within virtual reality environments. In order to provide comfortable and desired user experiences that do not include unnatural or unexpected visual presentations, various actions may be performed to avoid, resolve, or eliminate such interferences or collisions. For example, a user position may be moved or rotated such that an interference between a two-dimensional grid view user interface and a portion of a virtual reality environment may be avoided. In addition, a user may be instructed, e.g., via audio or haptic feedback and/or audio or visual instructions, to move or rotate a user position to avoid interference prior to presenting a two-dimensional grid view user interface. Further, a portion of the two-dimensional grid view user interface may be visually presented as partially transparent or translucent to indicate the interference. Moreover, a portion of the virtual reality environment may be visually presented as partially transparent or translucent to indicate the interference. Various other actions or combinations thereof may be performed to avoid, resolve, or eliminate interferences or collisions between two-dimensional grid view user interfaces and portions of virtual reality environments.

Figure 8:
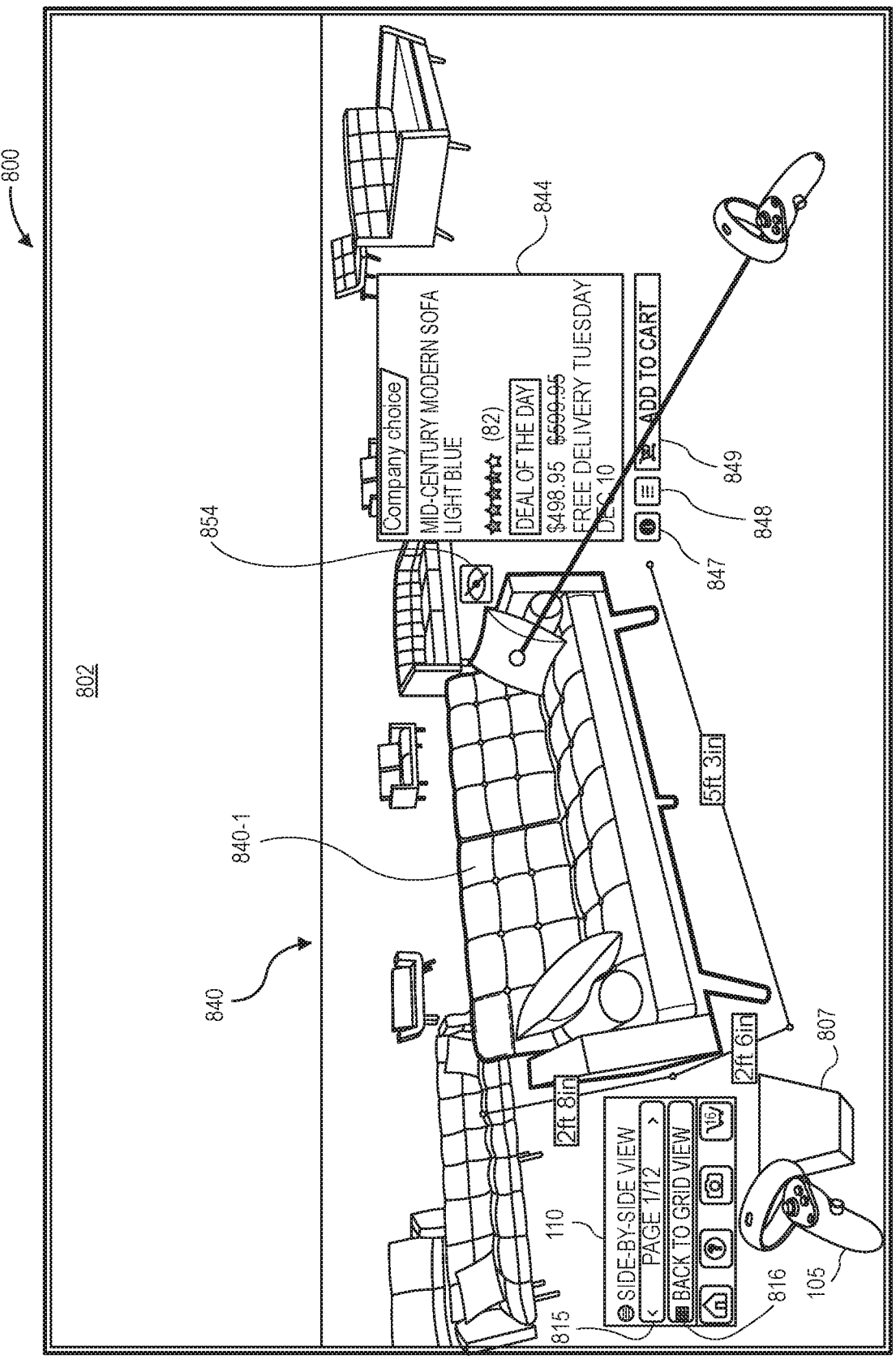
FIG. 8 is a schematic diagram of an example three-dimensional side-by-side view, object interface including a dynamic container for a virtual reality environment, in accordance with implementations of the present disclosure.

FIG. 8 is a schematic diagram 800 of an example three-dimensional side-by-side view, object interface including a dynamic container for a virtual reality environment, in accordance with implementations of the present disclosure.

As shown in FIG. 8, responsive to selection of a view products side-by-side button 450, 650, 750, as described with respect to at least FIGS. 4, 6, and 7, the presentation of a plurality of objects may transition from a two-dimensional grid view user interface, such as the views shown in FIGS. 3-7, to a three-dimensional side-by-side view user interface 840, such as the view shown in FIG. 8. The three-dimensional side-by-side view user interface 840 may provide an even more immersive, three-dimensional experience to facilitate evaluation and comparison of a plurality of objects by a user within a virtual reality environment.

During the transition from the two-dimensional grid view user interface to the three-dimensional side-by-side view user interface, various aspects of the virtual reality environment 802 may change. For example, at least one wall surface and/or at least one ceiling surface, as well as one or more objects presented with a room or space, may be removed from the presentation of the virtual reality environment. In some example embodiments, all wall surfaces and all ceiling surfaces, as well as one or more objects presented within a room or space, may be removed from the presentation of the virtual reality environment, e.g., by shrinking or scaling down wall or ceiling surfaces and/or objects, by fading out or gradually making transparent wall or ceiling surfaces and/or objects, or by other visual changes to wall or ceiling surfaces and/or objects. Further, a sky or other outdoor environment may be presented instead of one or more wall and/or ceiling surfaces. The floor surface associated with a user position within the virtual reality environment may be substantially maintained as a visual anchor or reference surface during the transition of the virtual reality environment. In addition, the floor surface associated with the user position may be extended out in all directions, e.g., apparently infinitely toward a horizon, around the user position. In example embodiments, a type of flooring, such as hardwood, tiles, or other patterns or textures associated with the floor surface may be similarly extended out in all directions around the user position. By maintaining and extending out the floor surface in all directions, the floor surface may act as a visual anchor or reference surface for a user, such that the user may maintain a connection with the room or space of the virtual reality environment that has been modified, and may not become disoriented or confused by being moved or transported to an entirely different virtual reality environment. In this manner, the modified virtual reality environment 802 may comprise a substantially open, three-dimensional area that extends out in all directions, e.g., apparently infinitely toward a horizon, around a user position. Further, the substantially open, three-dimensional area may be presented as aligned along a horizontal surface within a field of view of a user and extending out in all directions around a user position of the user, and the horizontal surface may be substantially flat or planar. In one example coordinate system, an x-axis may extend left-right and substantially horizontally across a field of view of a user, a y-axis may extend up-down and substantially vertically across a field of view of a user, and a z-axis may extend in-out and substantially horizontally toward or away from a user position of a user, and each of the x-axis, y-axis, and z-axis may be substantially orthogonal to each other. With reference to this example coordinate system, the horizontal surface along which the substantially open, three-dimensional area may be aligned may extend along a plane parallel to that defined by the x-axis and the z-axis.

In other example embodiments, a visual anchor or reference surface during a transition between the two-dimensional grid view user interface and the three-dimensional side-by-side view user interface may comprise visual anchors or reference surfaces other than a floor surface, such as a wall surface, a ceiling surface, or other environment surfaces. For example, if a plurality of wall-mounted objects, such as mirrors, artwork, or other objects, are to be presented to a user, a wall surface may be selected as a visual anchor or reference surface during a transition between a two-dimensional grid view user interface and a three-dimensional side-by-side view user interface presenting the plurality of wall-mounted objects. Likewise, if a plurality of ceiling-mounted objects, such as lights, chandeliers, or other objects, are to be presented to a user, a ceiling surface may be selected as a visual anchor or reference surface during a transition between a two-dimensional grid view user interface and a three-dimensional side-by-side view user interface presenting the plurality of ceiling-mounted objects. Other environment surfaces and/or combinations of surfaces may be used as visual anchors or reference surfaces during transitions between two-dimensional grid view user interfaces and three-dimensional side-by-side view user interfaces. Moreover, various aspects of transitions between two-dimensional grid view user interfaces and three-dimensional side-by-side view user interfaces may be set or selected as preferences or default settings by a user within a virtual reality environment, such as removal and replacement of one or more surfaces and/or objects, presentation of outdoor environments, selection of visual anchors or reference surfaces, user position or orientation responsive to transitions, or other aspects of transitions.

Within the substantially open, three-dimensional area of the modified virtual reality environment, a plurality of objects may be presented and arranged in a desired format, e.g., in respective positions, locations, or boxes within the three-dimensional area. The plurality of objects that are presented and arranged in the three-dimensional side-by-side view user interface may correspond to the plurality of objects that were previously presented and arranged in the two-dimensional grid view user interface. In addition, the plurality of objects may include a plurality of floors or pages in the three-dimensional side-by-side view user interface that correspond to the plurality of pages that were previously presented and arranged in the two-dimensional grid view user interface. Thus, each respective floor of a plurality of objects in the three-dimensional side-by-side view user interface may correspond to each respective page of the plurality of objects that were previously presented and arranged in the two-dimensional grid view user interface.

In addition, upon initiation of a three-dimensional side-by-side view user interface within the virtual reality environment, one or more selectable options associated with the menu 110 that may be attached or associated with the controller 105 may change. For example, additional selectable options may include a page toggle button 815 and a back to grid view button 816. Various other selectable options may also be included in the menu 110, as further described herein.

For example, the page toggle button 815 may enable a user to select and view presentations of different floors or pages of the plurality of objects that correspond to the plurality of pages that were previously presented in the two-dimensional grid view user interface. In addition, the back to grid view button 816 may transition the presentation from the three-dimensional side-by-side view user interface back to the two-dimensional grid view user interface, as described herein.

Each of the plurality of objects may be presented as a two-dimensional image or a three-dimensional model that is associated with each of the objects. In addition, each of the two-dimensional images or three-dimensional models associated with objects that are presented within the three-dimensional side-by-side view may be presented in an actual size or scale in relation to a room or space of the virtual reality environment as compared to the reduced size of objects that are presented within a two-dimensional grid view, and may be arranged in a desired format, e.g., in respective positions, locations, or boxes within the three-dimensional side-by-side view. In one example, the reduced size of objects presented within the two-dimensional grid may occupy a first percentage of a field of view, e.g., 5, 10, or other percentage, and the actual size of objects presented in a three-dimensional side-by-side view may occupy a second percentage of the field of view that is larger than the first percentage, e.g., 15, 20, or other percentage. In another example, the reduced size of objects presented within the two-dimensional grid may be scaled down by a defined percentage, e.g., 15, 30, 50, or other percentage of the actual size of objects presented in a three-dimensional side-by-side view. In a further example, the reduced size of objects presented within the two-dimensional grid may be scaled down by a defined percentage, e.g., 15, 30, 50, or other percentage of the actual size of objects presented in a three-dimensional side-by-side view, based on a size of a position, location, container, or box within which the object is presented within the two-dimensional grid and based on a larger size of a position, location, container, or box within which the object is presented within the three-dimensional side-by-side view. Further, each of the objects that are presented within the three-dimensional side-by-side view may also include one or more details or information that are presented in association with the objects, such as price, user rating, number of positive or negative user reviews or ratings, shipping or delivery options, seller, brand, or manufacturer information, material, color, dimensions, or any other aspect or characteristic of the object.

In some example embodiments, to improve user experience, the three-dimensional side-by-side view user interface may initially be presented with two-dimensional images that may be processed and presented relatively quickly, and upon processing or loading associated three-dimensional models, the three-dimensional models may replace the two-dimensional images within the three-dimensional side-by-side view user interface to provide a more immersive, three-dimensional experience within the virtual reality environment. Further, the processing or loading of associated three-dimensional models may be ordered or prioritized to load those three-dimensional models that are closest to a user position, before loading those three-dimensional models that are farther from a user position. In other example embodiments, the processing or loading of associated three-dimensional models may be ordered or prioritized to load those three-dimensional models that more closely match filters selected by a user, before loading those three-dimensional models that less closely match filters selected by the user. In other example embodiments, a user may set or select a preference or default setting for either two-dimensional images or three-dimensional models to be presented via the three-dimensional side-by-side view user interface.

In example embodiments, the plurality of objects presented and arranged via the three-dimensional side-by-side view user interface may be presented in a same relative scale, such that the various objects that are presented together via the three-dimensional side-by-side view user interface may be viewed, evaluated, or compared in a same relative scale. In additional example embodiments, in order to facilitate viewing, evaluation, and comparison of a plurality of objects in the three-dimensional side-by-side view user interface, various types, categories, or sizes of objects may be presented and arranged in particular manners. For example, smaller objects or furnishings that are intended for placement on top of tables, desks, shelves, or other furniture may be presented and arranged on common tables, shelves, or horizontal surfaces that are presented as extending within the three-dimensional side-by-side view user interface. In addition, objects that are intended for attachment to a wall surface, such as artwork, mirrors, clocks, or similar objects, may be presented and arranged on common wall or vertical surfaces that are presented as extending within the three-dimensional side-by-side view user interface. Further, objects that are intended for attachment to a ceiling surface, such as lights, chandeliers, or similar objects, may be presented and arranged on common ceiling or overhead surfaces that are presented as extending within the three-dimensional side-by-side view user interface. Various other types, categories, or sizes of objects may be presented and arranged in different manners to improve user experiences with viewing, evaluation, and comparison of the objects.

In addition, the plurality of objects presented and arranged via the three-dimensional side-by-side view user interface may be presented with a defined spacing between individual objects. For example, the defined spacing may be a set value, such as a few feet, one meter, or other distances. In addition, the defined spacing may be set or specified by a user, e.g., by inputting a numerical value or by moving a slider or toggle input element. Further, the defined spacing may depend on various aspects or characteristics of the objects. For example, the defined spacing between a plurality of sofas, couches, dining tables, desks, or other similarly sized objects may be a first value, e.g., a few feet or other larger distances, whereas the defined spacing between pillows, desk lamps, pencil holders, or other similar sized objects may be a second value, e.g., one foot or other smaller distances.

The plurality of objects may also be presented as static or moving, e.g., rotating, models of the plurality objects. In addition, the plurality of objects may be manipulated or interacted with by a user, e.g., to rotate, grasp, release, or otherwise modify a view of the plurality of objects. Further, in some example embodiments, the plurality of objects may include various animations, e.g., related to key or interesting features of the objects.

Further, in contrast to the two-dimensional grid view user interfaces described herein in which a user may scroll along each page of a plurality of pages of objects, in the three-dimensional side-by-side view user interfaces, a user may move among the objects on each floor of the plurality of floors of objects. For example, a user within the virtual reality environment may physically walk, move, or rotate to view and move among the plurality of objects, with limits imposed by an actual physical space within which the user is viewing the virtual reality environment. In addition, a user may alter a user position within the virtual reality environment by virtually walking, moving, or rotating to view and move among the plurality of objects, based on inputs received via one or more input elements associated with the controller. Further, in some embodiments, a user may alter a user position within the virtual reality environment by virtually teleporting or jumping to view and move among the plurality of objects, based on inputs received via one or more input elements associated with the controller. In this manner, a user may move among and view a plurality of objects presented via a three-dimensional side-by-side view user interface to evaluate and compare objects that are presented substantially in actual size and at a same relative scale.

Moreover, in some example embodiments, a dynamic container 807 may also be presented within the virtual reality environment. The dynamic container 807 may be attached or associated with a controller 105, and/or the dynamic container 807 may be placed, moved, oriented, or otherwise manipulated within the virtual reality environment. Various objects may be selected, moved, and placed into the dynamic container 807 to facilitate various operations, such as searching, browsing, viewing, evaluating, comparing, or other actions related to one or more objects within the virtual reality environment. Further, the dynamic container 807 may include various characteristics that may be modifiable by a user within the virtual reality environment, such as size, shape, position, orientation, a scale of objects placed therein, a number of objects placed therein, a spacing of objects placed therein, or other characteristics. Additional details associated with the dynamic container 807 are further described herein, at least with respect to FIG. 9.

Using the three-dimensional side-by-side view user interface, various user interactions with each of the plurality of objects may be enabled to facilitate viewing, browsing, selecting, evaluating, and comparing of objects. For example, responsive to receiving a hover indication with respect to an object, e.g., based on directing or aiming a pointing device associated with the controller 105 onto an object, at least one additional detail associated with the object may be presented, such as a price, user rating, brand, material, color, dimensions, or any other aspect or characteristic of the object. In some example embodiments, the additional details that may be presented upon receiving a hover indication may be additional details that are related to one or more filters selected by a user. For example, if a user selected one or more filters related to materials, the additional details that may be presented upon receiving a hover indication may be related to materials included in the object. In addition, a visual presentation of the object may be modified responsive to the hover indication, such as by highlighting, outlining, pulsing, changing size, or other visual indications.

In addition, responsive to receiving a selection input with respect to an object 840-1, e.g., based on selection input via an input element associated with the controller 105, from a plurality of objects presented via a three-dimensional side-by-side view user interface, such as the view shown in FIG. 8, various additional details associated with the object may be presented, such as a price, user rating, brand, material, color, dimensions, or any other aspect or characteristic of the object. In addition, responsive to receiving a selection input with respect to an object presented via the three-dimensional side-by-side view user interface, a current object within the virtual reality environment may be replaced or swapped with the selected object. For example, if the three-dimensional side-by-side view user interface is being presented to view objects similar to an object currently presented in the room or space, the selection input may cause replacement or swapping of the currently presented object in the room or space with the selected object.

In the example shown in FIG. 8, upon receiving a selection input with respect to an object 840-1, e.g., a particular sofa included in the three-dimensional side-by-side view user interface of FIG. 8, the additional details associated with the selected object may include, similar to that described at least with respect to FIG. 5, a detail card 844 associated with the selected object, and a plurality of selectable options, such as a full details button 847, an add to list button 848, an add to shopping cart button 849, and a hide or remove button 854. In addition, the detail card 844 and the selectable options may be presented as overlaying at least a portion of the three-dimensional side-by-side view user interface and the virtual reality environment.

The detail card 844 may include additional details associated with the selected object, such as badges, e.g., "Company Choice," name, materials, brand, price, user rating, availability information, shipping information, or other aspects or characteristics of the selected object. In addition, the full details button 847 may present a product detail page associated with the selected object that may include images, videos, all additional details, product options, user reviews, brand or manufacturer information, similar, related, or recommended products, or other information and details. The add to list button 848 may enable a user to add the selected object to one or more lists that may be provided to or generated by a user. The add to shopping cart button 849 may enable a user to add the selected object to a shopping cart or list including objects for potential purchase. In addition, the hide button 854 may cause the selected object to be hidden or removed from presentation within the three-dimensional side-by-side view user interface, e.g., to facilitate user viewing, filtering, sorting, selection, and evaluation of a plurality of objects.

Further, responsive to receiving a grasping input with respect to an object presented via the three-dimensional side-by-side view user interface, e.g., based on a grasping or grabbing input via an input element associated with the controller 105, a three-dimensional model of the object may be placed within the virtual reality environment, e.g., within the room or space of the virtual reality environment. For example, responsive to receiving the grasping input with respect to an object, the three-dimensional side-by-side view user interface may fade or no longer be presented, the virtual reality environment may change back to a previously presented room or space within the virtual reality environment, a three-dimensional model of the object may be attached to, held, moved, and/or oriented using the controller within the virtual reality environment, the three-dimensional model of the object may modify a size to an actual size relative to the room or space of the virtual reality environment, and the object may be placed within the room or space by a user, e.g., based on a release or placement input via an input element associated with the controller.

During a transition from the three-dimensional side-by-side view user interface back to a two-dimensional grid view user interface, and/or during a transition from the three-dimensional side-by-side view user interface back to a previously presented room or space within the virtual reality environment, various aspects of the virtual reality environment 802 may change back to a previously presented room or space within the virtual reality environment. For example, any wall surfaces and/or ceiling surfaces, as well as one or more objects presented within a room or space, that were removed may be added to the presentation of the virtual reality environment, e.g., by growing or building up wall or ceiling surfaces and/or objects, by fading in or gradually making opaque wall or ceiling surfaces and/or objects, or by other visual changes to wall or ceiling surfaces and/or objects. Further, a sky or other outdoor environment may no longer be presented instead of one or more wall and/or ceiling surfaces. The floor surface associated with a user position within the virtual reality environment may be substantially maintained as a visual anchor or reference surface during the transition of the virtual reality environment. In addition, the floor surface associated with the user position may be retracted back from all directions, e.g., apparently toward wall surfaces of the room or space, around the user position. In example embodiments, a type of flooring, such as hardwood, tiles, or other patterns or textures associated with the floor surface may be similarly retracted back from all directions around the user position. By maintaining and retracting back the floor surface from all directions, the floor surface may act as a visual anchor or reference surface for a user, such that the user may maintain a connection with the previously presented room or space of the virtual reality environment that had been modified, and may not become disoriented or confused by being moved or transported back to the previously presented room or space of the virtual reality environment. In this manner, the virtual reality environment may return to a presentation of the previously presented room or space, which may also include a two-dimensional grid view user interface that comprises a substantially flat, two-dimensional grid including a plurality of objects that corresponds to the plurality of objects that were previously presented in the three-dimensional side-by-side view user interface within the virtual reality environment.

In other example embodiments, a visual anchor or reference surface during a transition between the two-dimensional grid view user interface and the three-dimensional side-by-side view user interface may comprise visual anchors or reference surfaces other than a floor surface, such as a wall surface, a ceiling surface, or other environment surfaces. For example, if a plurality of wall-mounted objects, such as mirrors, artwork, or other objects, are to be presented to a user, a wall surface may be selected as a visual anchor or reference surface during a transition between a two-dimensional grid view user interface and a three-dimensional side-by-side view user interface presenting the plurality of wall-mounted objects. Likewise, if a plurality of ceiling-mounted objects, such as lights, chandeliers, or other objects, are to be presented to a user, a ceiling surface may be selected as a visual anchor or reference surface during a transition between a two-dimensional grid view user interface and a three-dimensional side-by-side view user interface presenting the plurality of ceiling-mounted objects. Other environment surfaces and/or combinations of surfaces may be used as visual anchors or reference surfaces during transitions between two-dimensional grid view user interfaces and three-dimensional side-by-side view user interfaces.

Further, during the transition from the three-dimensional side-by-side view user interface back to the two-dimensional grid view user interface and/or the previously presented room or space within the virtual reality environment, a user position and orientation upon returning to the previously presented room or space may be defined in various manners. For example, a user may be returned to a user position and/or user orientation within the room or space from which the user initiated the transition to the three-dimensional side-by-side view user interface. In addition, if a user selected an object from the three-dimensional side-by-side view user interface to replace or swap a current object in the room or space, a user may be returned to a user position and orientation in the room or space that corresponds to a last user position and orientation relative to the selected object within the three-dimensional side-by-side view user interface. Further, if a user moved or rotated among the plurality of objects presented in the three-dimensional side-by-side view user interface, the user may be returned to a user position and orientation that is based on the movements or rotations performed by the user while viewing the three-dimensional side-by-side view user interface. Moreover, various user positions and orientations may be modified, moved, or rotated to avoid returning the user back to a user position or orientation that may be outside the room or space or other boundaries of the environment, or that interferes or collides with portions of the room or space, such as walls, doors, etc., or various objects presented within the room or space, such as furniture, furnishings, etc. Moreover, various aspects of transitions between two-dimensional grid view user interfaces and three-dimensional side-by-side view user interfaces may be set or selected as preferences or default settings by a user within a virtual reality environment, such as removal and replacement of one or more surfaces and/or objects, presentation of outdoor environments, selection of visual anchors or reference surfaces, user position or orientation responsive to transitions, or other aspects of transitions.

As set forth above, although the two-dimensional grid view user interfaces and three-dimensional side-by-side view user interfaces are generally described herein in the context of searching or browsing for furniture, furnishings, fixtures, or other objects, e.g., from a catalog of objects, in other example embodiments, the two-dimensional grid view user interfaces and three-dimensional side-by-side view user interfaces may be used to present objects that are currently present in a room or space, objects that are included in one or more lists or groups of objects, objects that are included in a shopping cart or list, objects that have been placed in one or more dynamic containers, and/or other lists or groups of objects, as well as various other aspects related to user experiences within virtual reality environments, such as user account settings, help topics, saved images or screenshots, or other aspects related to users, user accounts, or virtual reality environments.

Figure 9:
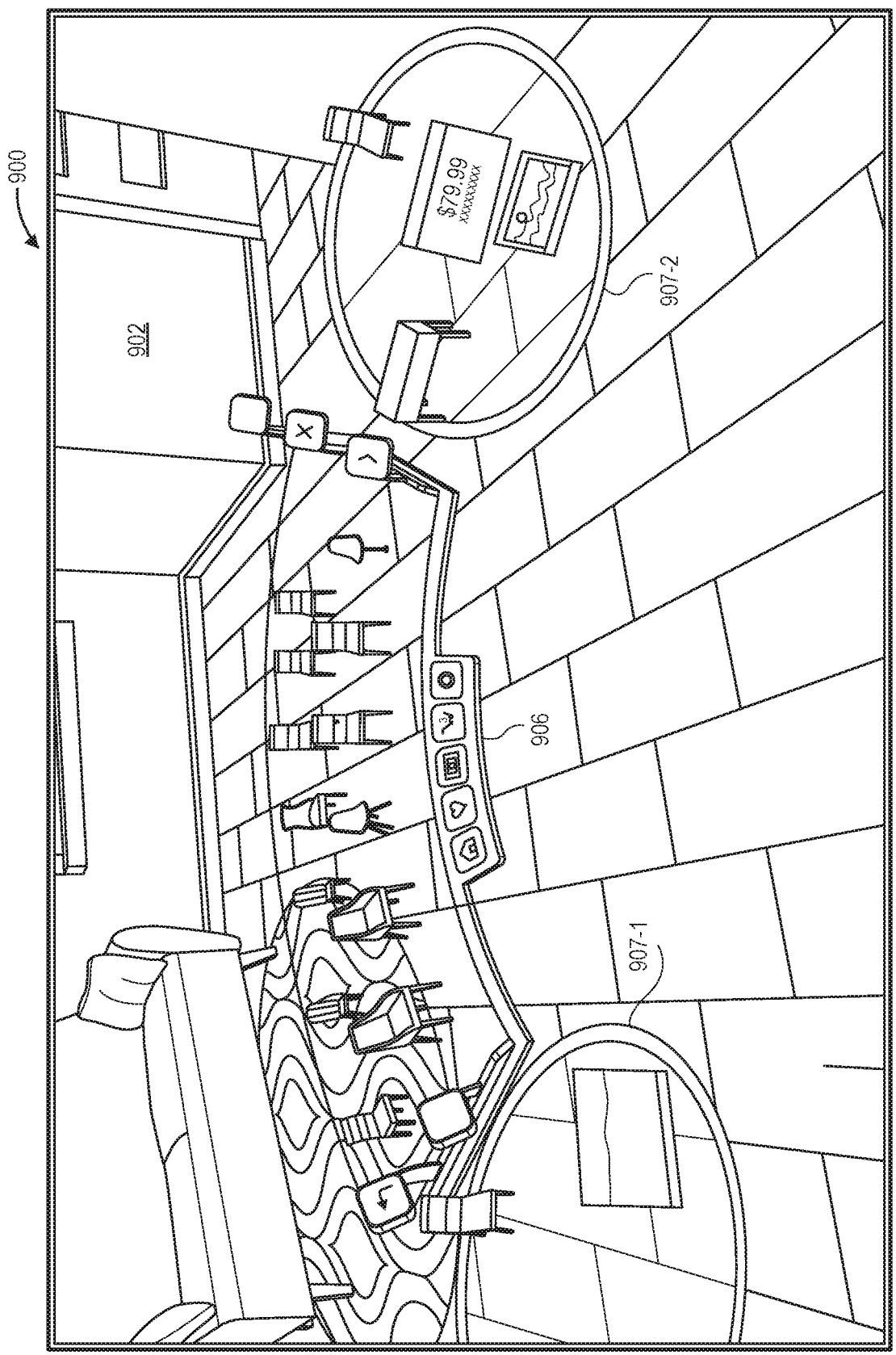
FIG. 9 is a schematic diagram of an example three-dimensional desk user interface including dynamic containers for a virtual reality environment, in accordance with implementations of the present disclosure.

FIG. 9 is a schematic diagram 900 of an example three-dimensional desk user interface including dynamic containers for a virtual reality environment, in accordance with implementations of the present disclosure.

As shown in FIG. 9, one or more dynamic containers 907-1, 907-2 may also be presented within a virtual reality environment 902. The dynamic containers 907 may be attached or associated with a controller, and/or the dynamic containers 907 may be placed, moved, oriented, or otherwise manipulated within the virtual reality environment.

In the example of FIG. 9, the dynamic containers 907 are associated with a three-dimensional desk user interface 906, which is described in U.S. patent application Ser. No. 16/437,806, filed Jun. 11, 2019, entitled "Three-Dimensional User Interface for Virtual Reality Environments," the contents of which are herein incorporated by reference in their entirety. The dynamic containers 907 may be attached or coupled to the three-dimensional desk user interface 906, such that the dynamic containers 907 may move responsive to movement or rotation of the desk user interface 906. In addition, each of the dynamic containers 907 may be moved to various positions and orientations independently from the desk user interface 906 and/or each other, such that each dynamic container 907-1, 907-2 may be detached or uncoupled from the desk user interface 906 and moved, rotated, or placed in various positions and orientations independently within the virtual reality environment.

In similar manner, each of the dynamic containers 207, 607, 707, 807 shown in FIGS. 2 and 4-8 may also be attached or coupled to a controller 105 and/or a desk user interface 906, such that each dynamic container 207, 607, 707, 807 may move responsive to movement or rotation of the controller 105 and/or the desk user interface 906. In addition, each dynamic container 207, 607, 707, 807 may be moved to various positions and orientations independently from the controller 105, the desk user interface 906, and/or other dynamic containers, such that each dynamic container 207, 607, 707, 807 may be detached or uncoupled from the controller 105, the desk user interface 906, and/or other dynamic containers, and moved, rotated, or placed in various positions and orientations independently within the virtual reality environment. In addition, visual presentation of individual dynamic containers may be initiated or stopped responsive to various inputs or actions by a user within a virtual reality environment.

Further, various characteristics of the dynamic containers may be modifiable, e.g., by a user within the virtual reality environment, such as size, shape, position, orientation, a scale of objects placed therein, a number of objects placed therein, a spacing of objects placed therein, or other characteristics. A dynamic container may have various shapes and sizes, such as a plate (e.g., FIGS. 2, 4, and 5), a bowl, a tray (e.g., FIG. 7), a bin, a circular shape (e.g., FIGS. 2, 4, 5, and 7), a rectangular shape (e.g., FIG. 6), a rounded shape (e.g., FIGS. 2, 4, 5, and 7), a prismatic shape (e.g., FIG. 8), a spherical shape, a two-dimensional shape (e.g., FIGS. 2 and 4-6), a three-dimensional shape (e.g., FIGS. 7 and 8), and/or various other shapes. In addition, a shape and size of a dynamic container may be modified, stretched, elongated, resized, shrunken, compressed, or otherwise modified by a user within a virtual reality environment.

Moreover, a dynamic container may also include a plurality of pages or layers, such that a multi-layered container may effectively comprise a plurality of dynamic containers. Likewise, a dynamic container may comprise a plurality of faces, surfaces, or areas, such that a multi-faceted container may effectively comprise a plurality of dynamic containers. For example, each face of a cube, rectangular prism, or other prismatic or three-dimensional dynamic container may comprise an individual dynamic container. In this manner, a user may quickly and efficiently flip, turn, rotate, switch, or toggle between visual presentations of a plurality of dynamic containers to more effectively view, browse, select, evaluate, and compare a plurality of objects.

In addition, a scale of objects placed within a dynamic container may be modifiable, e.g., by a user within the virtual reality environment. In some example embodiments, all objects placed within a dynamic container may be scaled or reduced in size by a same amount or value, e.g., 10% of actual size, 5% of actual size, 1:16 scale, 1:24 scale, or other amounts or values. In other example embodiments, objects placed within a dynamic container may be scaled or reduced in size by different respective amounts or values that are determined based on various factors, such as object type, category, or size, dynamic container size or shape, number of objects, spacing of objects, or other aspects or characteristics of objects and/or dynamic containers. For example, sofas may be scaled or reduced in size by a first amount or value, desk lamps may be scaled or reduced in size by a second amount or value, and/or other types, categories, or sizes of objects may be scaled or reduced in size by various different amounts or values. Further, scales of a plurality of objects placed within a dynamic container may be set or selected as a preference or setting by a user within the virtual reality environment. By modifying scales of objects placed within dynamic containers, objects may decrease in size when placed within dynamic containers, and/or objects may increase in size when removed or moved from dynamic containers and placed within virtual reality environments, e.g., rooms or spaces within virtual reality environments.

Further, a number of objects placed within a dynamic container may be modifiable, e.g., by a user within the virtual reality environment. In some example embodiments, each dynamic container may have a same capacity to receive a particular number of objects, e.g., three, five, ten, or other numbers of objects, or each dynamic container may have a different respective capacity to receive a particular number of objects. In other example embodiments, the respective capacity of each dynamic container may be determined based on various factors, such as object type, category, or size, dynamic container size or shape, scale of objects, spacing of objects, or other aspects or characteristics of objects and/or dynamic containers. For example, a first dynamic container may receive a first number of sofas, a second dynamic container may receive a second number of desk lamps, and/or other dynamic containers having various characteristics may receive other numbers of objects having various characteristics. Further, a number of objects placed within a dynamic container may be set or selected as a preference or setting by a user within the virtual reality environment.

Moreover, a spacing of objects placed within a dynamic container may be modifiable, e.g., by a user within the virtual reality environment. In some example embodiments, each dynamic container may have a same spacing between received objects, e.g., two, five, or ten millimeters, or other spacings, or each dynamic container may have a different respective spacing between received objects. In other example embodiments, the respective spacing of objects within each dynamic container may be determined based on various factors, such as object type, category, or size, dynamic container size or shape, scale of objects, number of objects, or other aspects or characteristics of objects and/or dynamic containers. For example, a first dynamic container may include a first spacing between a plurality of received sofas, a second dynamic container may include a second spacing between a plurality of received desk lamps, and/or other dynamic containers having various characteristics may include other respective spacings between received objects having various characteristics. In addition, spacing between objects may be determined based on complementary or related types or categories of objects, such as a dining table and dining chairs, a desk and an office chair, a sofa and a coffee table, a bedframe and an end table, or other similar complementary or related types or categories of objects. Further, a spacing of objects placed within a dynamic container may be set or selected as a preference or setting by a user within the virtual reality environment.

Furthermore, a position and orientation of objects within a dynamic container may also be modifiable, e.g., by a user within the virtual reality environment. For example, for a circular or rounded dynamic container, objects may be moved or placed in different positions and orientations associated with radial locations around the circular or rounded dynamic container. In addition, for a square or rectangular container, objects may be moved or placed in different positions and orientations associated with sections or grid locations within the square or rectangular container. Further, a position and orientation of objects placed within a dynamic container may be set or selected as a preference or setting by a user within the virtual reality environment. In some example embodiments, objects that are placed within a dynamic container may be substantially maintained in positions and orientations within the dynamic container at which a user placed the objects.

In addition, in example embodiments including a plurality of dynamic containers, objects placed within the dynamic containers may be moved or transferred into groups between or among the plurality of dynamic containers that are determined based on various factors, such as object type, category, or size, dynamic container size or shape, scale of objects, number of objects, or other aspects or characteristics of objects and/or dynamic containers. In some example embodiments, various filters selected by a user may be applied to dynamic containers to determine groups of objects that are associated with individual dynamic containers. For example, objects associated with a particular style, manufacturer, or brand, e.g., contemporary, modern, or traditional furniture, may be grouped together in a first dynamic container, objects associated with a particular type or category, e.g., dining room, bedroom, or family room furniture, may be grouped together in a second dynamic container, and/or various other objects having particular aspects or characteristics may be grouped together in various dynamic containers. Further, grouping of objects placed within dynamic containers may be set or selected as a preference or setting by a user within the virtual reality environment. In addition, objects that are placed into a group within a dynamic container may be substantially maintained as a group within the dynamic container in which a user placed the objects.

Each of a plurality of objects placed within a dynamic container may be presented as a two-dimensional image or a three-dimensional model that is associated with each of the objects. In some example embodiments, to improve user experience, the dynamic container may initially be presented with two-dimensional images that may be processed and presented relatively quickly, and upon processing or loading associated three-dimensional models, the three-dimensional models may replace the two-dimensional images within the dynamic container to provide a more immersive, three-dimensional experience within the virtual reality environment. In other example embodiments, a user may set or select a preference or default setting for either two-dimensional images or three-dimensional models to be presented within the dynamic container.

Various furniture, furnishings, fixtures, or other objects may be selected, moved, placed into, and removed from the dynamic containers 207, 607, 707, 807, 907 to facilitate various operations, such as searching, browsing, viewing, evaluating, comparing, or other actions related to one or more objects within the virtual reality environment.

Using one or more dynamic containers, various user interactions with each of a plurality of objects may be enabled to facilitate viewing, browsing, selecting, evaluating, and comparing of objects. For example, responsive to receiving a hover indication with respect to an object within a dynamic container, e.g., based on directing or aiming a pointing device associated with the controller 105 onto an object, at least one additional detail associated with the object may be presented within the dynamic container, such as a price, user rating, brand, material, color, dimensions, or any other aspect or characteristic of the object. In some example embodiments, the additional details that may be presented upon receiving a hover indication may be additional details that are related to one or more filters selected by a user. For example, if a user selected one or more filters related to materials, the additional details that may be presented upon receiving a hover indication may be related to materials included in the object. In addition, a visual presentation of the object within the dynamic container may be modified responsive to the hover indication, such as by highlighting, outlining, pulsing, changing size, or other visual indications.

In addition, responsive to receiving a selection input with respect to an object within a dynamic container, e.g., based on selection input via an input element associated with the controller 105, from a plurality of objects presented within the dynamic container, various additional details associated with the object may be presented, such as a price, user rating, brand, material, color, dimensions, or any other aspect or characteristic of the object. In addition, responsive to receiving a selection input with respect to an object presented within the dynamic container, a current object within the virtual reality environment may be replaced or swapped with the selected object. For example, if the object within the dynamic container is selected while an object currently presented in the room or space is also selected, the selection input may cause replacement or swapping of the currently presented object in the room or space with the selected object.

As described at least with respect to FIG. 5, upon receiving a selection input with respect to an object within a dynamic container, the additional details associated with the selected object may include a three-dimensional model of the selected object, a detail card associated with the selected object, a plurality of selectable options, such as a full details button, an add to list button, an add to shopping cart button, and a close button, and/or a plurality of filters or tags associated with the selected object. In addition, the three-dimensional model, the detail card, and the selectable options may be presented as overlaying the virtual reality environment, e.g., overlaying a room or space within the virtual reality environment, and the room or space may be presented as darkened, dimmed, or grayed out in order to facilitate user focus and interaction with the additional details associated with the selected object. In alternative embodiments, the room or space may not be presented as darkened, dimmed, or grayed out when the additional details are presented as overlaying the virtual reality environment to facilitate viewing and evaluation of changes to objects within the room or space responsive to user interactions with the additional details.

The three-dimensional model may be presented as a static or moving, e.g., rotating, model of the selected object. In addition, the three-dimensional model may be manipulated or interacted with by a user, e.g., to rotate, zoom, pan, or otherwise modify a view of the three-dimensional model. Further, in some example embodiments, the three-dimensional model may include various animations, e.g., related to key or interesting features of the selected object. In some example embodiments, to improve user experience, the additional details may initially be presented with a two-dimensional image of the selected object that may be processed and presented relatively quickly, and upon processing or loading an associated three-dimensional model, the three-dimensional model may replace the two-dimensional image within the additional details to provide a more immersive, three-dimensional experience within the virtual reality environment. In other example embodiments, a user may set or select a preference or default setting for either two-dimensional images or three-dimensional models to be presented via the additional details.

The detail card may include additional details associated with the selected object, such as badges, e.g., "Best Seller," name, materials, brand, price, user rating, availability information, shipping information, or other aspects or characteristics of the selected object. In addition, the full details button may present a product detail page associated with the selected object that may include images, videos, all additional details, product options, user reviews, brand or manufacturer information, similar, related, or recommended products, or other information and details. The add to list button may enable a user to add the selected object to one or more lists that may be provided to or generated by a user. The add to shopping cart button may enable a user to add the selected object to a shopping cart or list including objects for potential purchase. In addition, the close button may cause the additional details to be closed and no longer presented to a user within the virtual reality environment.

Further, responsive to receiving a grasping input with respect to an object presented within a dynamic container or presented with additional details upon selection, e.g., based on a grasping or grabbing input via an input element associated with the controller 105, a three-dimensional model of the object may be placed or applied within the virtual reality environment, e.g., within the room or space of the virtual reality environment. For example, responsive to receiving the grasping input with respect to an object, a three-dimensional model of the object may be attached to, held, moved, and/or oriented using the controller within the virtual reality environment, the three-dimensional model of the object may increase in size to an actual size relative to the room or space of the virtual reality environment, and the object may be placed within the room or space by a user, e.g., based on a release or placement input via an input element associated with the controller.

In this manner, various types of objects may be placed within one or more dynamic containers. In addition, additional information related to objects within dynamic containers may be presented to a user in various formats. Further, objects within dynamic containers may be filtered, sorted, arranged, or otherwise grouped into one or more dynamic containers based on various aspects or characteristics of the objects and/or dynamic containers. Moreover, objects within dynamic containers may be quickly and efficiently viewed or evaluated, e.g., upon placement of the objects within a room or space of the virtual reality environment, by viewing the objects within a two-dimensional grid view user interface, and/or by viewing the objects within a three-dimensional side-by-side view user interface.

Furthermore, one or more dynamic containers and/or objects placed therein may be saved or persisted across user sessions within a virtual reality environment. In addition, for virtual reality experiences including multiple users, dynamic containers and/or objects placed therein may be visible to other users, may be hidden from view from other users, and/or may be shared or restricted for viewing by other users, e.g., based on selected user preferences. By sharing or allowing viewing of dynamic containers and/or objects placed therein between multiple users within a virtual reality environment, collaborative and/or cooperative experiences may be supported and enabled within virtual reality environments.

Figure 10A:
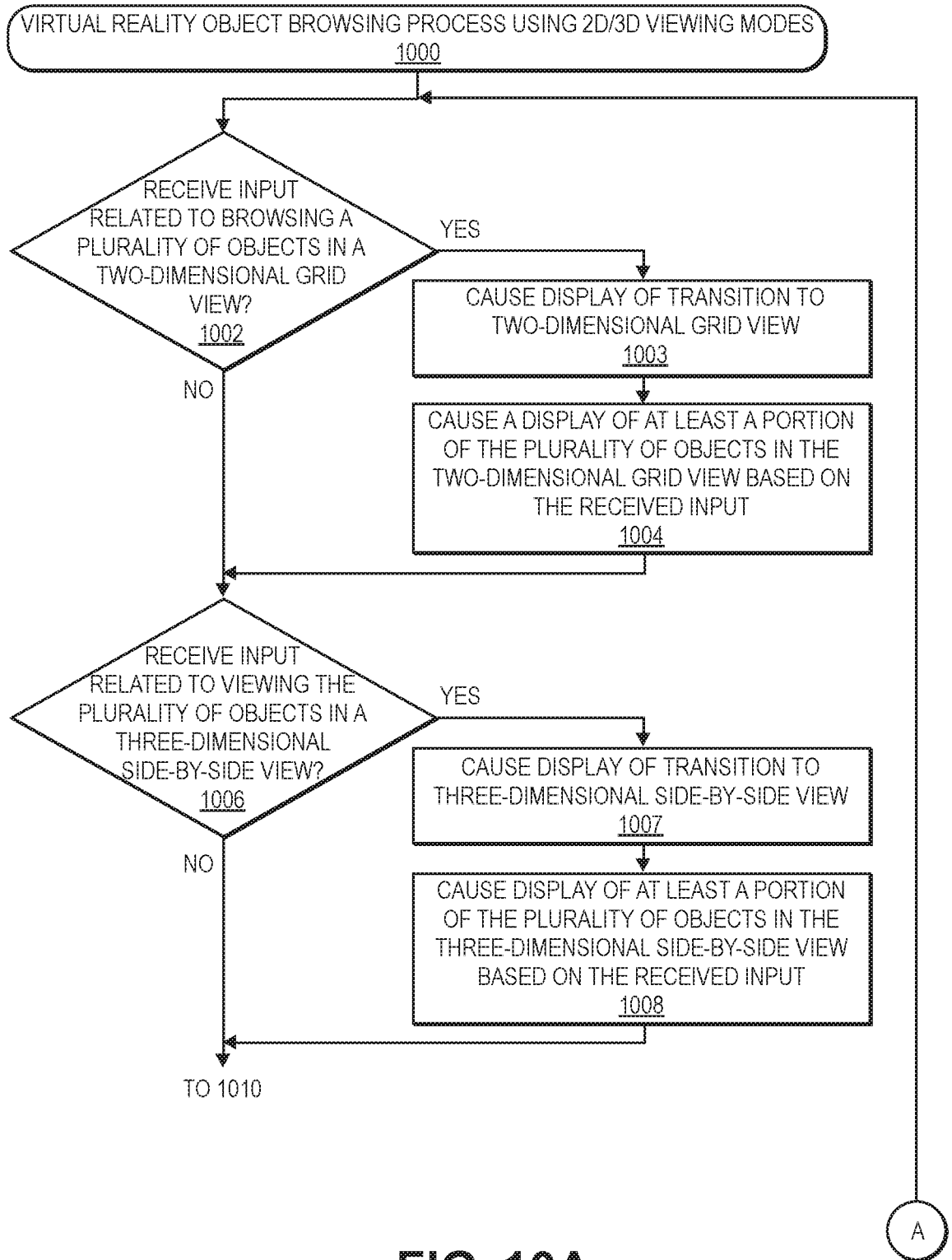
FIGS. 10A and 10B are a flow diagram illustrating an example virtual reality object browsing process using 2D/3D viewing modes, in accordance with implementations of the present disclosure.
Figure 10B:
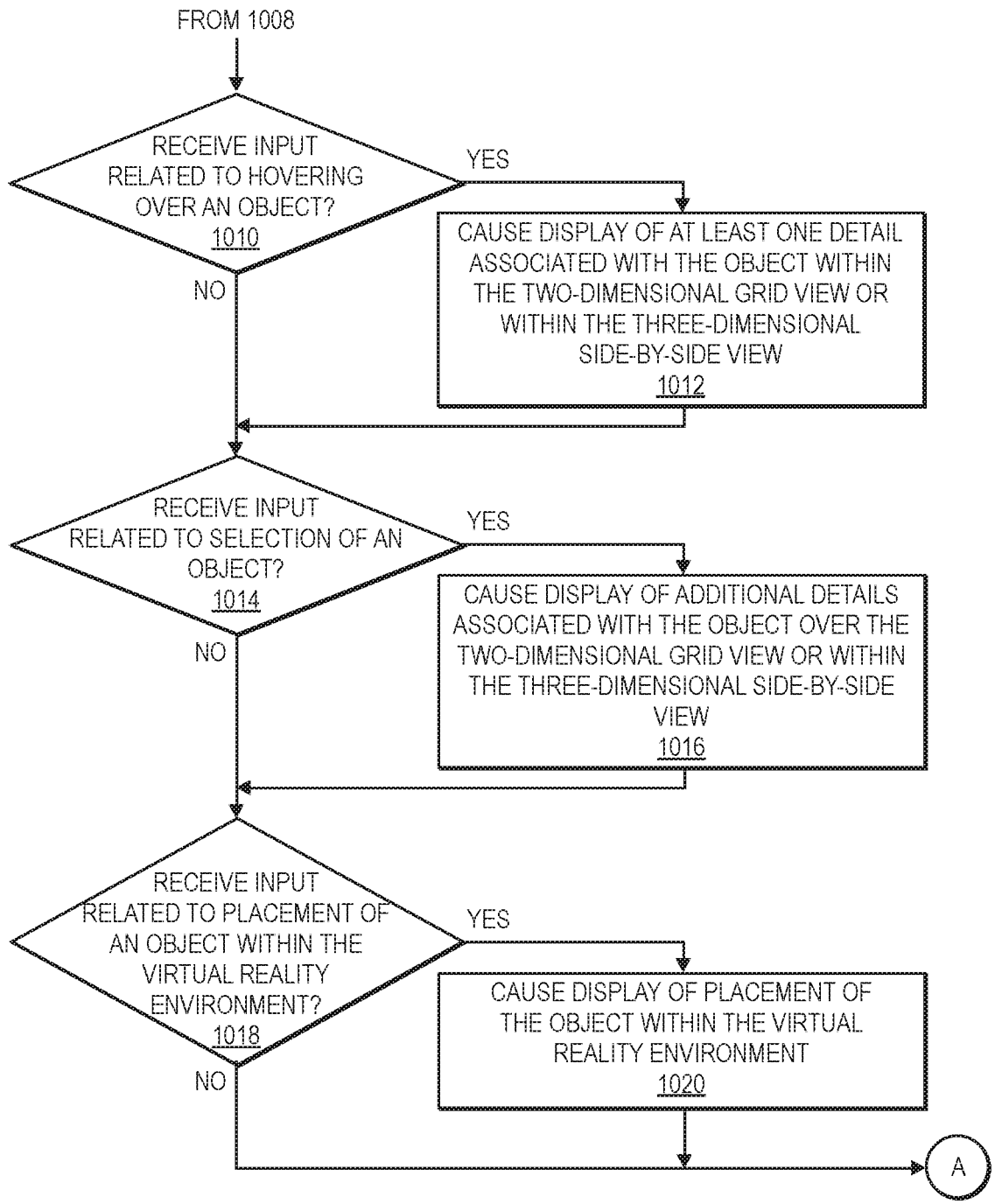

FIGS. 10A and 10B are a flow diagram illustrating an example virtual reality object browsing process using 2D/3D viewing modes 1000, in accordance with implementations of the present disclosure.

The process 1000 may begin by determining whether an input related to browsing a plurality of objects in a two-dimensional grid view is received, as at 1002. For example, various inputs may be received from a user, e.g., inputs received by a controller, inputs received via gestures, and/or voice inputs, to cause presentation of a two-dimensional grid view user interface.

If it is determined that an input related to browsing a plurality of objects in a two-dimensional grid view is received, then the process 1000 may proceed with causing a display of a transition from a three-dimensional side-by-side view to the two-dimensional grid view, as at 1003. For example, responsive to an input by a user to transition a presentation from a three-dimensional side-by-side view to a two-dimensional grid view, various modifications may be made to a presentation of the virtual reality environment. For example, one or more floor, wall, ceiling, or other environment surfaces may be replaced, a floor surface or other visual anchor or reference surface may be retracted back around a user position toward one or more wall or other environment surfaces, and/or a room or space within the virtual reality environment may be presented, which may include one or more objects presented within the room or space. In other example embodiments, responsive to an input by a user to present a two-dimensional grid view that does not cause a transition from a three-dimensional side-by-side view, the process 1000 may skip step 1003 and proceed to step 1004, as described herein.

Then, the process 1000 may continue by causing a display of at least a portion of the plurality of objects in the two-dimensional grid view based on the received input, as at 1004. For example, a display or presentation device may present a two-dimensional grid view user interface including a substantially flat, two-dimensional grid including plurality of objects, a plurality of selectable options, and/or a plurality of filter options. In example embodiments, the plurality of objects may comprise various furniture, furnishings, fixtures, or other objects. In addition, the plurality of objects may be associated with one or more search queries, one or more categories or subcategories of objects, one or more objects currently presented within a virtual reality environment, one or more lists of objects created for or by a user, one or more shopping carts or lists of objects for potential purchase, and/or one or more dynamic containers generated by a user. Further, the user may interact with various portions of the two-dimensional grid view user interface to perform various functions, operations, or actions.

The process 1000 may proceed by determining whether an input related to browsing a plurality of objects in a three-dimensional side-by-side view is received, as at 1006. For example, various inputs may be received from a user, e.g., inputs received by a controller, inputs received via gestures, and/or voice inputs, to cause presentation of a three-dimensional side-by-side view user interface.

If it is determined that an input related to browsing a plurality of objects in a three-dimensional side-by-side view is received, then the process 1000 may proceed with causing a display of a transition from a two-dimensional grid view to the three-dimensional side-by-side view, as at 1007. For example, responsive to an input by a user to transition a presentation from a two-dimensional grid view to a three-dimensional side-by-side view, various modifications may be made to a presentation of the virtual reality environment. For example, one or more floor, wall, ceiling, or other environment surfaces may be removed, a floor surface or other visual anchor or reference surface may be extended out around a user position, and/or a room or space within the virtual reality environment, as well as one or more objects within the room or space, may no longer be presented. In other example embodiments, responsive to an input by a user to present a three-dimensional side-by-side view that does not cause a transition from a two-dimensional grid view, the process 1000 may skip step 1007 and proceed to step 1008, as described herein.

Then, the process 1000 may continue by causing a display of at least a portion of the plurality of objects in the three-dimensional side-by-side view based on the received input, as at 1008. For example, a display or presentation device may present a three-dimensional side-by-side view user interface including a substantially open, three-dimensional area including plurality of objects or three-dimensional models. In example embodiments, the plurality of objects may comprise various furniture, furnishings, fixtures, or other objects. In addition, the plurality of objects may be associated with one or more search queries, one or more categories or subcategories of objects, one or more objects currently presented within a virtual reality environment, one or more lists of objects created for or by a user, one or more shopping carts or lists of objects for potential purchase, and/or one or more dynamic containers generated by a user. Further, the user may interact with various portions of the three-dimensional side-by-side view user interface to perform various functions, operations, or actions.

The process 1000 may then continue to determine whether an input related to hovering over an object is received, as at 1010. For example, various inputs may be received from a user, e.g., inputs received from a pointing device associated with a controller, inputs received via gestures or head/eye tracking, and/or voice inputs, to cause presentation of at least one additional detail associated with an object that may include a hover indication over the object.

If it is determined that an input related to hovering over an object is received, then the process 1000 may continue by causing a display of at least one additional detail associated with the object within the two-dimensional grid view or within the three-dimensional side-by-side view, as at 1012. For example, a display or presentation device may change a visual presentation of the object, such as by highlighting, outlining, pulsing, changing size, or other visual indications, within the two-dimensional grid view user interface or within the three-dimensional side-by-side view user interface. In addition, the display or presentation device may present at least one additional detail, e.g., in a hover card or panel, associated with the object within the two-dimensional grid view user interface or within the three-dimensional side-by-side view user interface.

The process 1000 may then proceed to determine whether an input related to selection of an object is received, as at 1014. For example, various inputs may be received from a user, e.g., inputs received by a controller, inputs received via gestures, and/or voice inputs, to cause presentation of additional details associated with a selected object.

If it is determined that an input related to selection of an object is received, then the process 1000 may continue by causing a display of additional details associated with the object over the two-dimensional grid view or within the three-dimensional side-by-side view, as at 1016. For example, a display or presentation device may present a three-dimensional model, full details, selectable options, and/or a plurality of filters or tags associated with the selected object. The additional details may be presented as overlaid, e.g., in a detail card or panel, on top of the two-dimensional grid view user interface, and/or the additional details may be presented together with and/or alongside a selected object within the three-dimensional side-by-side view user interface.

The process 1000 may then continue with determining whether an input related to placement of an object within the virtual reality environment is received, as at 1018. For example, various inputs may be received from a user, e.g., inputs received by a controller, inputs received via gestures, and/or voice inputs, to cause presentation of grasping, movement, and placement of an object within a virtual reality environment.

If it is determined that an input related to placement of an object is received, then the process 1000 may continue by causing a display of placement of the object within the virtual reality environment, as at 1020. For example, a display or presentation device may cause the two-dimensional grid view user interface and/or the three-dimensional side-by-side view user interface to fade or no longer be presented. In addition, the display or presentation device may present grasping and movement of a three-dimensional model of the object into a room or space within the virtual reality environment, a change in size of the object to an actual size relative to the room or space of the virtual reality environment, and placement of the object within the room or space by a user.

The process 1000 may be repeated in various manners or sequences to cause presentation of two-dimensional grid view user interfaces and/or three-dimensional side-by-side view user interfaces including various groups or pluralities of objects. In addition, the process 1000 may be repeated in various manners or sequences to present various levels of information associated with one or more objects responsive to various inputs or interactions received from users within virtual reality environments, such as hover indications, selection inputs, and/or placement inputs. Further, various other functions, actions, or operations may be performed responsive to various other types of inputs or interactions described herein in the context of two-dimensional grid view user interfaces and/or three-dimensional side-by-side view user interfaces within virtual reality environments.

Figure 11A:
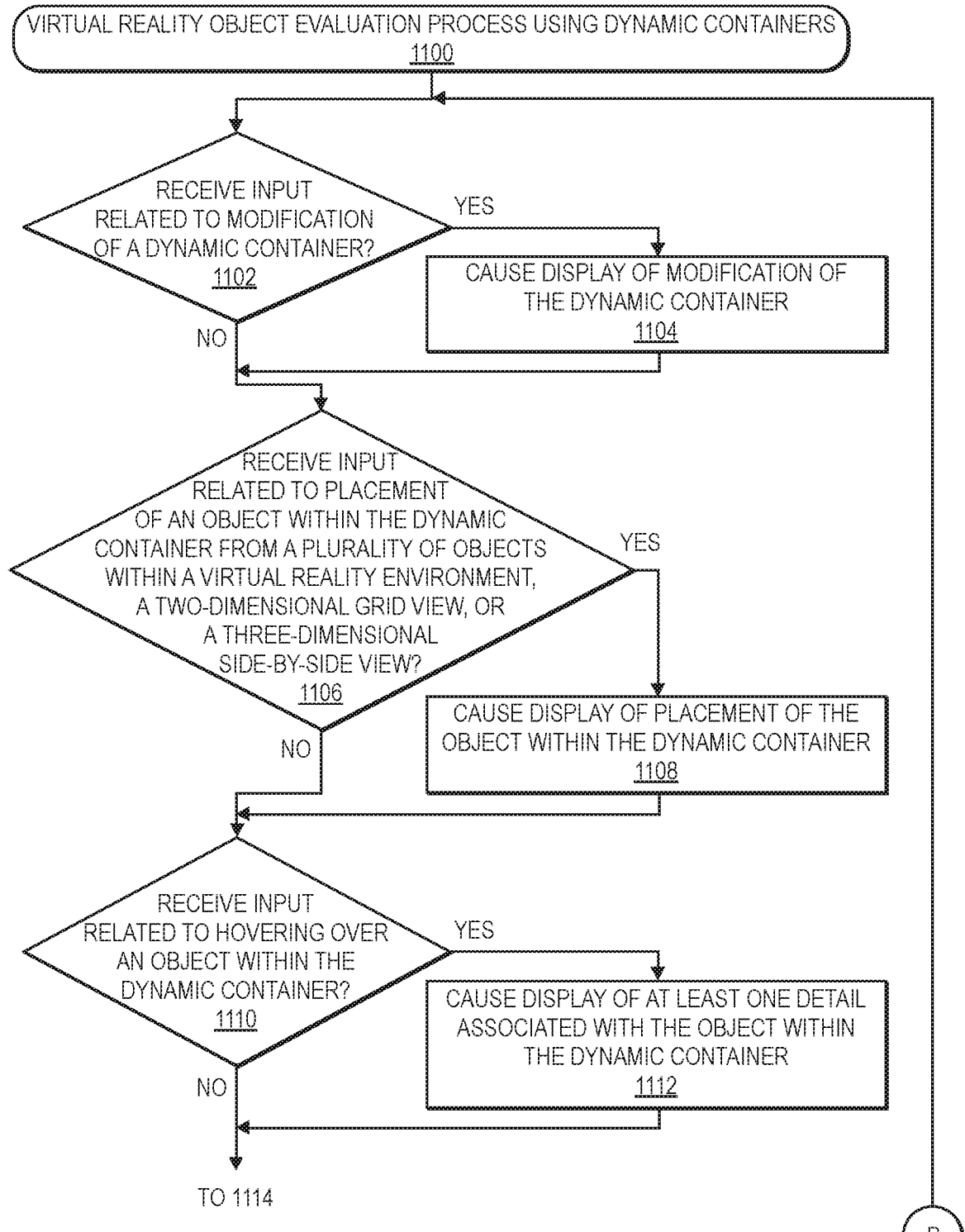
FIGS. 11A and 11B are a flow diagram illustrating an example virtual reality object evaluation process using dynamic containers, in accordance with implementations of the present disclosure.
Figure 11B:
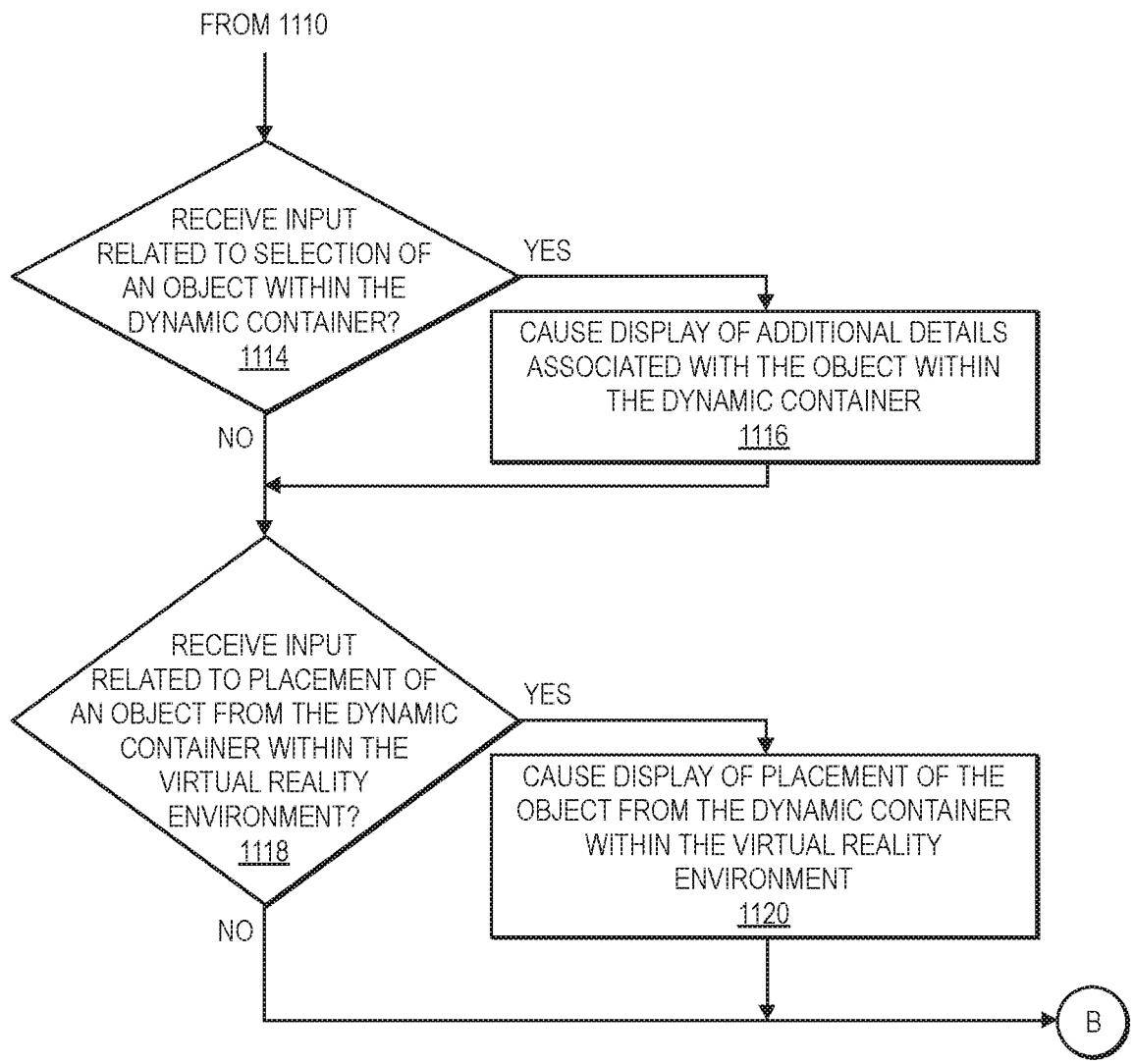

FIGS. 11A and 11B are a flow diagram illustrating an example virtual reality object evaluation process using dynamic containers 1100, in accordance with implementations of the present disclosure.

The process 1100 may begin by determining whether an input related to modification of a dynamic container is received, as at 1102. For example, various inputs may be received from a user, e.g., inputs received by a controller, inputs received via gestures, and/or voice inputs, to cause presentation of one or more modifications to a dynamic container that is configured to receive one or more objects for viewing, evaluation, comparison, or other functions.

If it is determined that an input related to modification of a dynamic container is received, then the process 1100 may continue by causing a display of modification of the dynamic container, as at 1104. For example, a display or presentation device may cause presentation of modifications to various aspects or characteristics of dynamic containers, such as size, shape, position, orientation, a scale of objects placed therein, a number of objects placed therein, a spacing of objects placed therein, and other aspects or characteristics. In addition, one or more filters may be applied to dynamic containers, and a plurality of objects may be filtered, sorted, arranged, or otherwise grouped into respective dynamic containers of a plurality of dynamic containers.

The process 1100 may proceed by determining whether an input related to placement of an object within a dynamic container is received, as at 1106. For example, various inputs may be received from a user, e.g., inputs received by a controller, inputs received via gestures, and/or voice inputs, to cause presentation of placement of an object within a dynamic container.

If it is determined that an input related to placement of an object within a dynamic container is received, then the process 1100 may continue by causing a display of placement of the object within the dynamic container, as at 1108. For example, a display or presentation device may present placement of the object within the dynamic container, e.g., by reducing a size of the object within the dynamic container, by changing a scale of the object within the dynamic container, by arranging the object at a particular location or portion of the dynamic container, and/or by grouping the object with one or more other objects within the dynamic container. In example embodiments, the object may comprise various furniture, furnishings, fixtures, or other objects. In addition, the objects may be selected and placed within the dynamic container from one or more objects currently presented within a virtual reality environment, one or more objects presented via a two-dimensional grid view user interface, one or more objects presented via a three-dimensional side-by-side view user interface, one or more search queries, one or more categories or subcategories of objects, one or more lists of objects created for or by a user, one or more shopping carts or lists of objects for potential purchase, and/or one or more other dynamic containers generated by a user. Further, the user may interact with various portions of the dynamic container to perform various functions, operations, or actions.

The process 1100 may then continue to determine whether an input related to hovering over an object within a dynamic container is received, as at 1110. For example, various inputs may be received from a user, e.g., inputs received from a pointing device associated with a controller, inputs received via gestures or head/eye tracking, and/or voice inputs, to cause presentation of at least one additional detail associated with an object within a dynamic container that may include a hover indication over the object.

If it is determined that an input related to hovering over an object within a dynamic container is received, then the process 1100 may continue by causing a display of at least one additional detail associated with the object within the dynamic container, as at 1112. For example, a display or presentation device may change a visual presentation of the object, such as by highlighting, outlining, pulsing, changing size, or other visual indications, within the dynamic container. In addition, the display or presentation device may present at least one additional detail, e.g., in a hover card or panel, associated with the object within the dynamic container.

The process 1100 may then proceed to determine whether an input related to selection of an object within a dynamic container is received, as at 1114. For example, various inputs may be received from a user, e.g., inputs received by a controller, inputs received via gestures, and/or voice inputs, to cause presentation of additional details associated with a selected object within a dynamic container.

If it is determined that an input related to selection of an object within a dynamic container is received, then the process 1100 may continue by causing a display of additional details associated with the object within the dynamic container, as at 1116. For example, a display or presentation device may present a three-dimensional model, full details, selectable options, and/or a plurality of filters or tags associated with the selected object. The additional details may be presented as overlaid, e.g., in a detail card or panel, on top of a current presentation of a virtual reality environment.

The process 1100 may then continue with determining whether an input related to placement of an object from a dynamic container within the virtual reality environment is received, as at 1118. For example, various inputs may be received from a user, e.g., inputs received by a controller, inputs received via gestures, and/or voice inputs, to cause presentation of grasping, movement, and placement of an object from a dynamic container within a virtual reality environment.

If it is determined that an input related to placement of an object from a dynamic container is received, then the process 1100 may continue by causing a display of placement of the object from the dynamic container within the virtual reality environment, as at 1120. For example, a display or presentation device may present grasping and movement of a three-dimensional model of the object from the dynamic container into a room or space within the virtual reality environment, a change in size of the object from the dynamic container to an actual size relative to the room or space of the virtual reality environment, and placement of the object within the room or space by a user.

The process 1100 may be repeated in various manners or sequences to cause presentation or modification of one or more dynamic containers including various groups or pluralities of objects. In addition, the process 1100 may be repeated in various manners or sequences to present various levels of information associated with one or more objects within dynamic containers responsive to various inputs or interactions received from users within virtual reality environments, such as hover indications, selection inputs, and/or placement inputs. Further, various other functions, actions, or operations may be performed responsive to various other types of inputs or interactions described herein in the context of dynamic containers within virtual reality environments.

In example embodiments, the various commands, inputs, or instructions described herein may be explicit commands or inputs related to manipulations, selections, or other actions associated with user interfaces within a virtual reality environment. However, in other example embodiments, the various commands, inputs, or instructions described herein may be implied commands or inputs based on programming logic and/or various actions performed or initiated by a user or by an application within the virtual reality environment related to manipulations, selections, or other actions associated with user interfaces within the virtual reality environment.

Although the example embodiments are described herein in the context of virtual reality environments and virtual reality objects, in other example embodiments, the systems, methods, and processes described herein may be implemented in other environments having corresponding objects, such as augmented reality environments and augmented reality objects, mixed reality environments and mixed reality objects, extended reality environments and extended reality objects, or other similar environments and objects. For example, mixed reality environments or extended reality environments may comprise various combinations of augmented reality environments and objects and virtual reality environments and objects. Further, the various processes, functions, and operations described herein may be performed and executed by various types of virtual reality, augmented reality, and/or extended reality systems and devices, including Oculus systems and devices by Facebook®, Hololens systems and devices by Microsoft®, virtual reality systems and devices by Intel®, Daydream systems and devices by Google®, and other related or similar systems and devices.

Further, although the example embodiments described herein are generally related to manipulations and/or interactions of a single user within a virtual reality environment, in other example embodiments, a plurality of users may manipulate and/or interact with user interfaces and virtual reality objects concurrently as described herein within a virtual reality environment. For example, multiple users may be viewing, manipulating, and/or interacting concurrently with user interfaces and various objects within the same virtual reality environment. Each of the multiple users may manipulate and/or interact with user interfaces and various objects within the virtual reality environment independently from each other. In addition, the multiple users may hand off manipulation and/or interaction with user interfaces and objects between themselves. Further, the multiple users may communicate with each other within the environment, such as via audio communications using microphones and speakers and/or visual communications using gestures, motions, pointers, or other visual indications. Moreover, each of the multiple users may be presented with selectable menu options, selection elements, and/or other user interface elements independently from other users. However, various operations associated with such selectable menu options, selection elements, and/or other user interface elements may affect aspects of the environment as a whole, including other users within the environment, such that multiple users within the environment may interact collaboratively in the environment that is shared and viewable by the multiple users.

In further example embodiments, one of the multiple users within the same virtual reality environment may be designated as a primary user, and the primary user may have relatively more control over various interactions within the environment. For example, user interfaces as described herein may be presented or displayed for viewing by the primary user, e.g., positioned or oriented toward a user position of the primary user within the environment. Other secondary users within the environment may therefore need to modify their positions within the environment in order to view such user interfaces that are positioned or oriented toward the position of the primary user. This directed presentation toward the primary user may facilitate collaborative discussion and interaction between the multiple users within the environment, such that visual communications using gestures, motions, or pointers, as well as audio communications, may be understood by the multiple users with reference to a common reference point, i.e., the user interfaces positioned or oriented toward the primary user. In addition, various operations associated with selectable menu options, selection elements, and/or other user interface elements may require confirmation or acceptance by the primary user before modifying aspects of the environment as a whole, including for other users within the environment, such that multiple users within the environment may interact collaboratively in the environment that is shared and viewable by the multiple users, while still allowing primary control over changes and modifications by the primary user. Moreover, the designation of the primary user among multiple users within an environment may be transferred between the multiple users as desired.

In other example embodiments, one or more of the multiple users may view, manipulate, and/or interact with the environment using various computing devices that present visual data as two-dimensional visual data, instead of three-dimensional visual data, models, and objects of virtual reality environments. For example, some of the multiple users may view the environment using desktop computers, laptop computers, tablet computers, mobile computing devices, or other computing devices that may include two-dimensional display devices, audio input devices, audio output devices, and/or other input/output devices such as a keyboard, mouse, trackpad, stylus, pointer, touch-sensitive input device or surface, or other devices. Using such example computing devices, some of the multiple users, such as secondary users, may view and/or interact with two-dimensional visual data of the environment from various viewpoints. For example, a secondary user may view and/or interact with the environment from a viewpoint of the user, or primary user, interacting within the virtual reality environment using a headset, goggles, other wearable computing device, etc. In addition, a secondary user may view and/or interact with the environment from a viewpoint of one or more fixed or stationary viewpoints or cameras placed within the environment, e.g., an overhead view, a view from an elevated corner of the room, a view from a center of a wall of the room, or other views. Further, a secondary user may be able to pan, zoom, rotate, or otherwise modify such views from various viewpoints or cameras, as well as switch or move between views from various viewpoints or cameras. Moreover, a secondary user may view and/or interact with the environment from one or more viewpoints that may be stored and transmitted to the secondary user for viewing, e.g., based on a selection by the primary user.

In accordance with the example embodiments described herein, a plurality of users may efficiently and intuitively communicate and collaborate with each other within a virtual reality environment. In addition, a plurality of users within a virtual reality environment may simply and intuitively manipulate and/or interact with user interfaces, virtual reality objects, and/or other aspects of the virtual reality environments concurrently within the same virtual reality environment.

Figure 12:
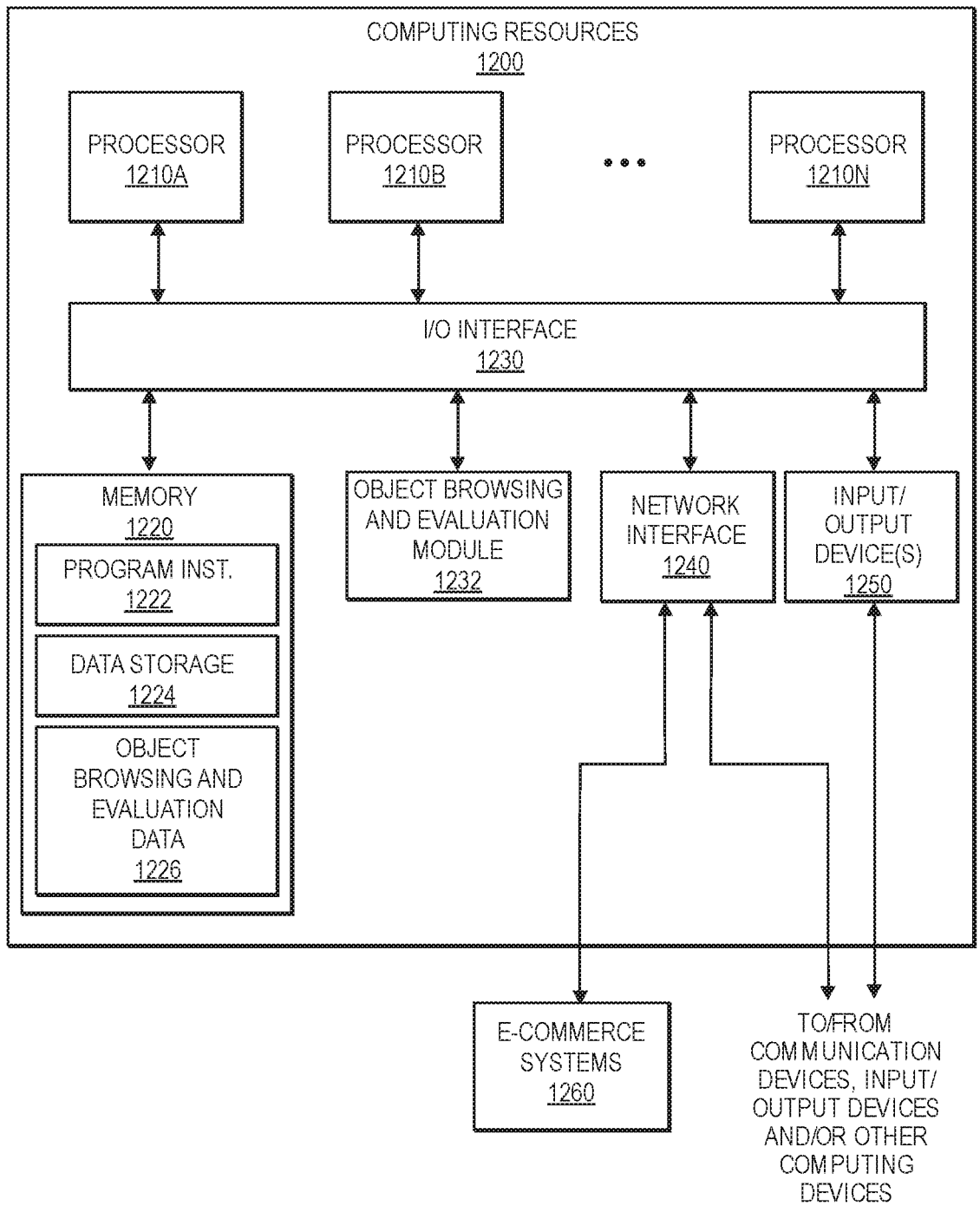
FIG. 12 is a block diagram illustrating various components of example computing resources associated with object browsing and evaluation for virtual reality environments, in accordance with implementations of the present disclosure.

FIG. 12 is a block diagram illustrating various components of example computing resources 1200 associated with object browsing and evaluation for virtual reality environments, in accordance with implementations of the present disclosure.

In various examples, the block diagram may be illustrative of one or more aspects of computing resources 1200 that may be used to implement the various systems and processes discussed above. In the illustrated implementation, the computing resources 1200 may include one or more processors 1210, coupled to a non-transitory computer readable storage medium 1220 via an input/output (I/O) interface 1230. The computing resources 1200 may also include an object browsing and evaluation module 1232, a network interface 1240, and one or more input/output devices 1250.

The computing resources 1200 may be included as part of a computing device or system, a display device or system, a virtual reality computing device or system, a smart or connected home device or system, other input/output devices or systems, and/or other computing systems, or combinations thereof. In various implementations, the computing resources 1200 may be a uniprocessor system including one processor 1210, or a multiprocessor system including several processors 1210A-1210N (e.g., two, four, eight, or another suitable number). The processor(s) 1210 may be any suitable processor capable of executing instructions. For example, in various implementations, the processor(s) 1210 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1210 may commonly, but not necessarily, implement the same ISA.

The non-transitory computer readable storage medium 1220 may be configured to store executable instructions, data, virtual reality environment data, virtual reality device and/or controller data, two-dimensional grid view user interface data, three-dimensional side-by-side view user interface data, dynamic container data, furniture, furnishing, fixture, and object data, two-dimensional image or object data, three-dimensional model or object data, functions, commands, actions, or instructions data, inputs or selections data, user and user account data, and/or any other data items accessible by the processor(s) 1210. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1220 as program instructions 1222, data storage 1224 and object browsing and evaluation data 1226, respectively. In other implementations, program instructions, data and/or object browsing and evaluation data may be received, sent or stored upon different types of computer-accessible media, such as non-transitory media, or on similar media separate from the non-transitory computer readable storage medium 1220 or the computing resources 1200.

Generally speaking, a non-transitory, computer readable storage medium may include storage media or memory media such as magnetic or optical media, e.g., disk or CD/DVD-ROM, coupled to the computing resources 1200 via the I/O interface 1230. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1240.

In one implementation, the I/O interface 1230 may be configured to coordinate I/O traffic between the processor(s) 1210, the non-transitory computer readable storage medium 1220, and any peripheral devices, the network interface 1240 or other peripheral interfaces, such as input/output devices 1250. In some implementations, the I/O interface 1230 may perform any necessary protocol, timing or other data transformations to convert data signals from one component (e.g., non-transitory computer readable storage medium 1220) into a format suitable for use by another component (e.g., processor(s) 1210). In some implementations, the I/O interface 1230 may include support for devices attached through various types of peripheral buses, such as a variant of the Peripheral Component Interconnect (PCI) bus standard or the Universal Serial Bus (USB) standard, for example. In some implementations, the function of the I/O interface 1230 may be split into two or more separate components, such as a north bridge and a south bridge, for example. Also, in some implementations, some or all of the functionality of the I/O interface 1230, such as an interface to the non-transitory computer readable storage medium 1220, may be incorporated directly into the processor(s) 1210.

The object browsing and evaluation module 1232, potentially in combination with one or more processors 1210, may perform the various processes, functions, and operations described herein with respect to virtual reality environments, virtual reality objects, two-dimensional grid view user interfaces, three-dimensional side-by-side view user interfaces, transitions between two-dimensional grid view user interfaces and three-dimensional side-by-side view user interfaces, dynamic containers, user interactions with virtual reality objects, dynamic containers, and/or user interfaces, and/or other aspects of virtual reality environments described herein.

The network interface 1240 may be configured to allow data to be exchanged between the computing resources 1200, other devices attached to a network, such as other computer systems, display devices, virtual reality devices, connected devices, smart home devices, sensors, other input/output elements, e-commerce computing systems 1260 including one or more object, product, and/or item catalog systems, purchase, lease, rent, and/or acquisition systems, and associated shipping and/or distribution systems, and/or other computing resources. For example, the network interface 1240 may enable wireless communication between the computing resources 1200 and one or more virtual reality devices and/or display or presentation devices that present virtual reality environments, objects, and/or user interfaces. In various implementations, the network interface 1240 may support communication via wireless general data networks, such as a Wi-Fi network. For example, the network interface 1240 may support communication via telecommunications networks such as cellular communication networks, satellite networks, and the like.

Input/output devices 1250 may, in some implementations, include one or more visual output devices, audio input/output devices, virtual reality devices and/or peripherals, headsets, goggles, wearable devices, controllers, joysticks, connected devices, smart home devices, input devices such as touchscreens, keyboards, mice, or remote controllers, image capture devices, audio sensors, temperature sensors, other sensors described herein, etc. Multiple input/output devices 1250 may be present and controlled by the computing resources 1200.

As shown in FIG. 12, the memory may include program instructions 1222 which may be configured to implement the example processes and/or sub-processes described above. The data storage 1224 and object browsing and evaluation data 1226 may include various data stores for maintaining data items that may be provided for presentation, modification, interaction, and/or manipulation of virtual reality environments, virtual reality objects, two-dimensional grid view user interfaces, three-dimensional side-by-side view user interfaces, and/or dynamic containers, as well as any other functions, operations, interactions, manipulations, or processes described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes. Additionally, one or more of the operations may be considered optional and/or not utilized with other operations.

Those skilled in the art will appreciate that the computing resources 1200 are merely illustrative and are not intended to limit the scope of the present disclosure. In particular, the computing systems and devices may include any combination of hardware or software that can perform the indicated functions, including computers, network devices, internet appliances, PDAs, wireless phones, etc. The computing resources 1200 may also be connected to other devices that are not illustrated, or instead may operate as stand-alone systems. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the computing resources 1200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the computing resources 1200 may be transmitted to the computing resources 1200 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other computing resource configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed, and various elements may be added, reordered, combined, omitted, modified, etc., in other implementations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, virtual reality, mixed reality, extended reality, and/or augmented reality systems and processes should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 10A-11B, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to present user interfaces in an extended reality environment, comprising:
    receiving, via an input device, a command to present a two-dimensional grid user interface within the extended reality environment;
    causing, via a display device, presentation of the two-dimensional grid user interface within the extended reality environment, the two-dimensional grid user interface being aligned substantially vertically within a field of view of a user, and the two-dimensional grid user interface including a plurality of objects;
    receiving, via the input device, a command to transition from the presentation of the two-dimensional grid user interface to a presentation of a three-dimensional side-by-side user interface within the extended reality environment;
    causing, via the display device, presentation of a transition from the two-dimensional grid user interface to the three-dimensional side-by-side user interface, wherein a floor surface within the extended reality environment is substantially maintained between the presentations of the two-dimensional grid user interface and the three-dimensional side-by-side user interface as a visual anchor to the user during the transition; and
    causing, via the display device, the presentation of the three-dimensional side-by-side user interface within the extended reality environment, the three-dimensional side-by-side user interface being aligned substantially horizontally within the field of view of the user, and the three-dimensional side-by-side user interface including three-dimensional representations of at least some of the plurality of objects included in the two-dimensional grid user interface;
    wherein the two-dimensional grid user interface includes a substantially flat, two-dimensional grid aligned substantially vertically within the field of view of the user including two-dimensional images or three-dimensional models associated with the plurality of objects;
    wherein the substantially flat, two-dimensional grid user interface comprises a plurality of pages, respective ones of the plurality of pages including a respective portion of the plurality of objects, and respective ones of the plurality of pages being scrollable to view the respective portion of the plurality of objects;
    and
    wherein respective ones of the plurality of objects included in the presentation of the two-dimensional grid user interface are presented with a smaller size than respective ones of the three-dimensional representations of the at least some of the plurality of objects included in the presentation of the three-dimensional side-by-side user interface.

2. The computer-implemented method of claim 1, wherein the two-dimensional grid user interface further includes:
    a plurality of selectable menu options;
    a plurality of selectable filter options; and
    a selectable option associated with the command to transition from the presentation of the two-dimensional grid user interface to the presentation of the three-dimensional side-by-side user interface.

3. The computer-implemented method of claim 1,
    wherein the three-dimensional side-by-side user interface includes:
    a substantially open, three-dimensional area within the field of view of the user including three-dimensional models associated with the representations of the at least some of the plurality of objects; and
    a selectable option associated with a command to transition from the presentation of the three-dimensional side-by-side user interface to the presentation of the two-dimensional grid user interface.

4. The computer-implemented method of claim 3, wherein the substantially open, three-dimensional area including three-dimensional models associated with the representations of the at least some of the plurality of objects comprises a plurality of floors, respective ones of the plurality of floors including a respective portion of the plurality of objects that correspond to respective ones of a plurality of pages including a respective portion of the plurality of objects.

5. A computer-implemented method, comprising:
receiving, via an input device, a command to transition between a presentation of a two-dimensional user interface and a presentation of a three-dimensional user interface within an extended reality environment;
causing, via a display device, presentation of a transition between the two-dimensional user interface and the three-dimensional user interface, wherein a visual anchor within the extended reality environment is substantially maintained between the presentations of the two-dimensional user interface and the three-dimensional user interface during the transition; and
causing, via the display device, presentation of a selected one of the two-dimensional user interface or the three-dimensional user interface within the extended reality environment;
wherein the presentation of the three-dimensional user interface includes representations of at least a subset of a plurality of objects included in the presentation of the two-dimensional user interface;
wherein the two-dimensional user interface includes a substantially flat, two-dimensional grid aligned substantially vertically within a field of view of a user including two-dimensional images or three-dimensional models associated with the plurality of objects that are arranged in a first format; and
wherein the substantially flat, two-dimensional grid comprises a plurality of pages including respective portions of the plurality of objects, wherein respective ones of the plurality of pages are scrollable by the user of the extended reality environment.

6. The computer-implemented method of claim 5, wherein the visual anchor comprises at least one of a floor surface, a wall surface, or a ceiling surface presented within the extended reality environment;
wherein a presentation of the visual anchor is at least partially overlaid by the presentation of the two-dimensional user interface; and
wherein the presentation of the visual anchor extends relative to a user position in the presentation of the three-dimensional user interface.

7. The computer-implemented method of claim 5, wherein the two-dimensional user interface further includes:
a selectable option associated with the command to transition from the presentation of the two-dimensional user interface to the presentation of the three-dimensional user interface.

8. The computer-implemented method of claim 5, wherein the two-dimensional user interface is overlaid onto a presentation of the extended reality environment, the extended reality environment including a floor surface, a wall surface, and a ceiling surface.

9. The computer-implemented method of claim 5, wherein the three-dimensional user interface includes:
a substantially open, three-dimensional area within the field of view of the user including three-dimensional models associated with the representations of the at least a subset of the plurality of objects that are arranged in a second format; and
a selectable option associated with a command to transition from the presentation of the three-dimensional user interface to the presentation of the two-dimensional user interface.

10. The computer-implemented method of claim 9, wherein the substantially open, three-dimensional area comprises a plurality of floors including respective portions of the plurality of objects, wherein respective ones of the plurality of floors are navigable by the user within the extended reality environment.

11. The computer-implemented method of claim 5, further comprising:
receiving, via the input device, a hover indication associated with an object of the plurality of objects presented via the two-dimensional user interface or the three-dimensional user interface; and
responsive to receiving the hover indication, causing, via the display device, presentation of at least one additional detail associated with the object presented via the two-dimensional user interface or the three-dimensional user interface.

12. The computer-implemented method of claim 5, further comprising:
receiving, via the input device, a selection input associated with an object of the plurality of objects presented via the two-dimensional user interface or the three-dimensional user interface; and
responsive to receiving the selection input,
causing, via the display device, presentation of a three-dimensional model and additional details associated with the object overlaying the plurality of objects presented via the two-dimensional user interface; or
causing, via the display device, presentation of additional details associated with the object presented via the three-dimensional user interface.

13. The computer-implemented method of claim 12, further comprising:
responsive to receiving the selection input,
swapping a current object presented within the extended reality environment with the selected object.

14. The computer-implemented method of claim 5, further comprising:
receiving, via the input device, a grasping input associated with an object of the plurality of objects presented via the two-dimensional user interface or the three-dimensional user interface; and
responsive to receiving the grasping input, causing, via the display device, presentation of a three-dimensional model associated with the object presented via the two-dimensional user interface or the three-dimensional user interface for movement and placement within the extended reality environment.

15. The computer-implemented method of claim 14, wherein responsive to receiving the grasping input, the three-dimensional model associated with the object increases in size relative to the object presented via the two-dimensional user interface during the movement and placement within the extended reality environment.

16. The computer-implemented method of claim 5, wherein the plurality of objects comprise at least one of furniture, furnishings, or fixtures associated with the extended reality environment.

17. The computer-implemented method of claim 5, wherein the plurality of objects are associated with at least one of:
objects currently presented within the extended reality environment;
objects included in one or more lists;
objects included in a shopping cart; or
objects placed in one or more dynamic containers.

18. A computer-implemented method, comprising:
receiving, via an input device, a command to transition between a presentation of a two-dimensional user interface and a presentation of a three-dimensional user interface within an extended reality environment;
causing, via a display device, presentation of a transition between the two-dimensional user interface and the three-dimensional user interface, wherein a visual anchor within the extended reality environment is substantially maintained between the presentations of the two-dimensional user interface and the three-dimensional user interface during the transition; and
causing, via the display device, presentation of a selected one of the two-dimensional user interface or the three-dimensional user interface within the extended reality environment;
wherein the presentation of the two-dimensional user interface includes a substantially flat, two-dimensional grid aligned substantially vertically within a field of view of a user including two-dimensional images or three-dimensional models associated with a plurality of objects; and
wherein the presentation of the three-dimensional user interface includes a substantially open, three-dimensional area within the field of view of the user including three-dimensional models associated with at least a subset of the plurality of objects included in the presentation of the two-dimensional user interface;
wherein the visual anchor comprises a floor surface presented within the extended reality environment; and
wherein a presentation of the extended reality environment is modified by removing at least one of a wall surface or a ceiling surface in the presentation of the three-dimensional user interface.

19. A system, comprising:
a presentation device;
a processor communicatively coupled to the presentation device; and
a memory communicatively coupled to the processor, the memory storing program instructions that, when executed by the processor, cause the processor to at least:
present, via the presentation device, an extended reality environment; and
present, via the presentation device, a user interface within the extended reality environment, wherein the user interface includes a plurality of selectable objects;
wherein the presentation device is configured to present the user interface in a two-dimensional grid view and a three-dimensional side-by-side view;
wherein in the two-dimensional grid view, the plurality of selectable objects are presented as two-dimensional images or three-dimensional models in a substantially flat, two-dimensional grid aligned substantially vertically within a field of view of a user;
wherein the substantially flat, two-dimensional grid comprises a plurality of pages including respective portions of the plurality of selectable objects, wherein respective ones of the plurality of pages are scrollable by the user of the extended reality environment; and
wherein in the three-dimensional side-by-side view, the plurality of selectable objects are presented as three-dimensional models in a substantially open, three-dimensional area within the field of view of the user.

20. The system of claim 19, wherein the program instructions, when executed by the processor, further cause the processor to at least:
present, via the presentation device, a transition between presentations of the two-dimensional grid view and the three-dimensional side-by-side view;
wherein a visual anchor presented within the extended reality environment is substantially maintained during the transition between the presentations of the two-dimensional grid view and the three-dimensional side-by-side view.

* * * * *